(12) United States Patent
Yajima et al.

(10) Patent No.: US 9,749,846 B2
(45) Date of Patent: Aug. 29, 2017

(54) IMAGE RECOGNITION FOR PAIRING OF DEVICES

(71) Applicant: SONY MOBILE COMMUNICATIONS INC., Minato-ku (JP)

(72) Inventors: Chikashi Yajima, Kanagawa (JP); Takashi Kawakami, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 358 days.

(21) Appl. No.: 13/755,873

(22) Filed: Jan. 31, 2013

(65) Prior Publication Data
US 2013/0204939 A1    Aug. 8, 2013

Related U.S. Application Data

(60) Provisional application No. 61/594,725, filed on Feb. 3, 2012.

(51) Int. Cl.
| | |
|---|---|
| *H04W 8/24* | (2009.01) |
| *H04W 4/20* | (2009.01) |
| *H04W 8/00* | (2009.01) |
| *H04W 8/20* | (2009.01) |

(52) U.S. Cl.
CPC ............. *H04W 8/24* (2013.01); *H04W 4/206* (2013.01); *H04W 8/005* (2013.01); *H04W 8/20* (2013.01)

(58) Field of Classification Search
CPC ......... H04W 8/24; H04W 8/245; H04W 4/00; H04W 4/008; H04W 64/00; H04W 8/08

USPC .................................................. 709/204, 227
See application file for complete search history.

(56) References Cited

U.S. PATENT DOCUMENTS

| | | | | |
|---|---|---|---|---|
| 8,230,075 | B1* | 7/2012 | Weskamp et al. | 709/227 |
| 2001/0027492 | A1* | 10/2001 | Gupta | G06F 17/30887 |
| | | | | 709/245 |
| 2004/0015953 | A1* | 1/2004 | Vincent | G06F 8/65 |
| | | | | 717/173 |
| 2004/0237104 | A1* | 11/2004 | Cooper et al. | 725/38 |
| 2005/0030375 | A1* | 2/2005 | Zangrande et al. | 348/143 |
| 2008/0242220 | A1* | 10/2008 | Wilson | H04M 1/7253 |
| | | | | 455/3.04 |

(Continued)

FOREIGN PATENT DOCUMENTS

JP    2002-232420    8/2002

*Primary Examiner* — Backhean Tiv
(74) *Attorney, Agent, or Firm* — Oblon, McClelland, Maier & Neustadt, L.L.P.

(57) ABSTRACT

An information processing apparatus that stores a table associating first identification information corresponding to the information processing apparatus, second identification information corresponding to another information processing apparatus, and an image corresponding to the another information processing apparatus; captures image data; determines whether the captured image data includes the image corresponding to the another information processing apparatus; and controls a wireless interface to transmit, to the another information processing apparatus, a request for pairing with the another information processing apparatus when the determining determines that the captured image data includes the image corresponding to the another information processing apparatus.

18 Claims, 17 Drawing Sheets

(56) References Cited

U.S. PATENT DOCUMENTS

| | | | |
|---|---|---|---|
| 2009/0232086 A1* | 9/2009 | Li | H04W 76/021 370/330 |
| 2009/0240717 A1* | 9/2009 | Mimatsu | G06F 11/0727 |
| 2010/0082990 A1* | 4/2010 | Grigorovitch | H04W 12/06 713/176 |
| 2011/0081860 A1* | 4/2011 | Brown | H04N 1/00347 455/41.3 |
| 2011/0238751 A1* | 9/2011 | Belimpasakis et al. | 709/204 |
| 2011/0246909 A1* | 10/2011 | Berrett | H04W 4/206 715/753 |
| 2011/0295502 A1* | 12/2011 | Faenger | H04M 1/7253 701/431 |
| 2012/0033245 A1* | 2/2012 | Kurahashi | G06F 3/1204 358/1.14 |
| 2012/0050153 A1* | 3/2012 | Dvortsov | H04W 12/04 345/156 |
| 2012/0082039 A1* | 4/2012 | Li et al. | 370/252 |
| 2012/0144347 A1* | 6/2012 | Jo | G06F 3/04883 715/863 |
| 2012/0198531 A1* | 8/2012 | Ort | H04W 12/08 726/7 |
| 2012/0208466 A1* | 8/2012 | Park | G06F 1/1601 455/41.3 |
| 2012/0209982 A1* | 8/2012 | Elliott et al. | 709/224 |
| 2012/0244810 A1* | 9/2012 | Klos et al. | 455/41.2 |
| 2012/0287290 A1* | 11/2012 | Jain | H04L 63/18 348/207.1 |
| 2012/0297078 A1* | 11/2012 | Hong | G06F 9/5055 709/228 |
| 2013/0042010 A1* | 2/2013 | Reunamaki | G06F 3/011 709/227 |
| 2013/0090064 A1* | 4/2013 | Herron | H04W 8/005 455/41.2 |
| 2013/0189925 A1* | 7/2013 | Staskawicz | H04B 7/24 455/41.1 |
| 2013/0198816 A1* | 8/2013 | Bohli | H04L 63/061 726/4 |
| 2013/0204939 A1* | 8/2013 | Yajima | H04W 8/24 709/204 |
| 2013/0293584 A1* | 11/2013 | Anderson | 345/633 |
| 2014/0087665 A1* | 3/2014 | Yang | H04W 8/005 455/41.2 |
| 2015/0205550 A1* | 7/2015 | Lee | G06F 3/1204 358/1.15 |

* cited by examiner (PAIRING REQUEST TRANSMITTER)

(PAIRING REQUEST RECEIVER)

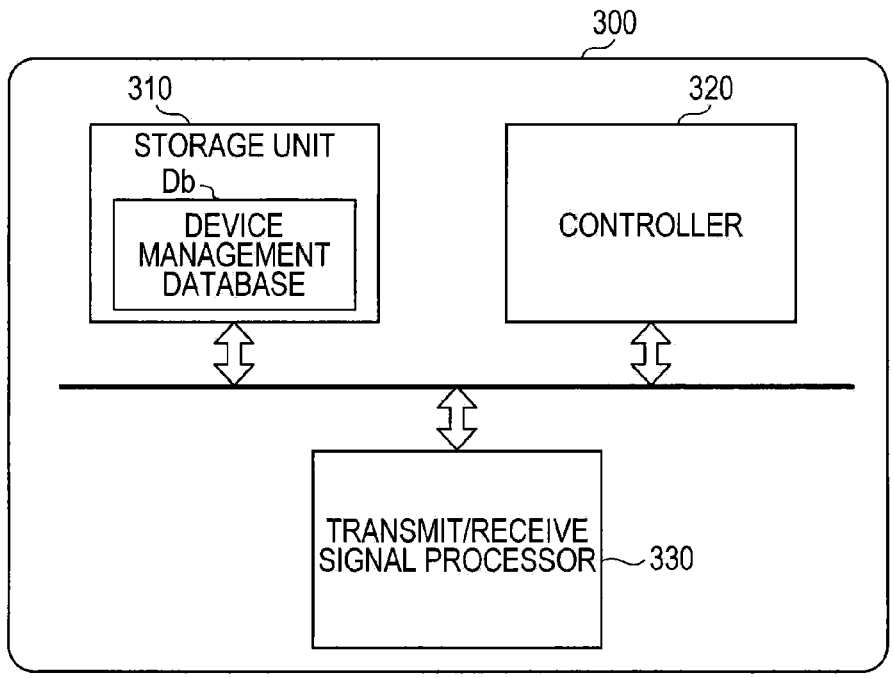

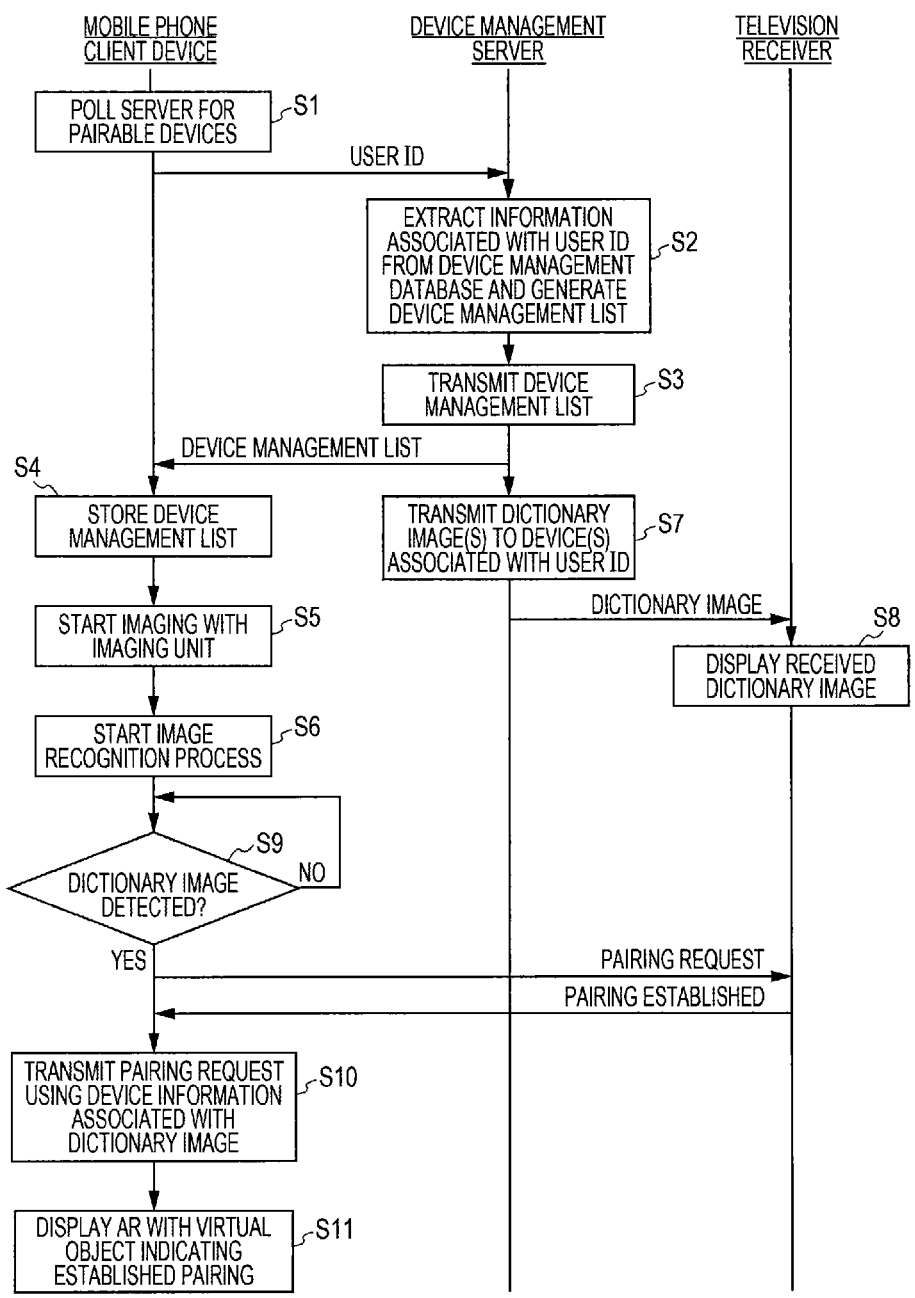

IMAGE RECOGNITION FOR PAIRING OF DEVICES

CROSS REFERENCE TO RELATED APPLICATION

The present application claims the benefit of the earlier filing date of U.S. Provisional Patent Application Ser. No. 61/594,725 filed on Feb. 3, 2012, the entire contents of which is incorporated herein by reference.

BACKGROUND

Field of the Disclosure

The present disclosure relates to a client device, and more specifically, it relates to technology for pairing conducted prior to establishing a wireless communication connection between client devices.

Description of Related Art

Recently, wireless communication such as Bluetooth (registered trademark) and wireless LAN, for example, are increasingly being used as communication means between electronic devices such as mobile phones, video game consoles, and television receivers. Wireless communication does not require wiring to connect electronic devices to each other. For this reason, by using wireless communication, it becomes possible to communicate with a desired electronic device, even with client devices which are used portably, such as mobile phones. Although having such merits, with wireless communication there are also risks that communicated information may be intercepted or that an outsider may intrude on a network.

In order to avoid such risks, a process called pairing is first conducted between the devices that will wirelessly communicate, prior to transmitting and receiving data by such communication. With pairing, required configuration information for wirelessly communicating is registered in each device that will wirelessly communicate. Required configuration information for wirelessly communicating may include an SSID (Service Set IDentifier) and MAC addresses, for example. By pairing prior to the actual communication, it is possible to prevent communication connections by outsiders who have not conducted pairing.

For example, Japanese Unexamined Patent Application Publication No. 2002-232420 describes a wireless communication system consisting of an authentication master and an authentication slave, in which a connection between the authentication master and the authentication slave is established on the condition that they share encrypted information generated on the basis of an encryption key and authentication identification information.

SUMMARY

Meanwhile, pairing is conducted in a state of mutual recognition between one or more device that are requesting wireless communication, and one or more devices that are being requested. A state of mutual recognition refers to a state in which one or more requesters and requestees are able to detect each other as communication-ready devices according to a given communication protocol. In other words, a plurality of devices are detected in a space where a plurality of such communication-ready devices according to a given communication protocol exist.

In such cases, a list of connectable devices is displayed on the screen of a display unit when the connection-requesting device is provided with a display unit. Then, a wireless connection is initiated with a device from among the devices displayed in the list which has been selected by the user as the device with which wireless communication is desired. However, the information displayed in this list is usually client identification information such as SSIDs and MAC addresses, and there has been a problem in that users have difficulty determining which client identification information from the list corresponds to the device to which he or she wants to connect.

The inventor of the present disclosure recognizes the need to shorten the procedure required to pair with a device with which a wireless connection is desired, and the need to realize pairing with a desired device with more intuitive operations.

According to an exemplary embodiment, the present disclosure is directed to an information processing apparatus that stores a table associating first identification information corresponding to the information processing apparatus, second identification information corresponding to another information processing apparatus, and an image corresponding to the another information processing apparatus; captures image data; determines whether the captured image data includes the image corresponding to the another information processing apparatus; and controls a wireless interface to transmit, to the another information processing apparatus, a request for pairing with the another information processing apparatus when the determining determines that the captured image data includes the image corresponding to the another information processing apparatus.

According to an embodiment of the present disclosure, due to the user holding up his or her own client device in the direction of a desired device to pair with, a pattern identical to a second image is detected in a first image according to an image signal output from an imaging signal. Then, a pairing request is transmitted to the desired pairing target client device. In other words, the user becomes able to pair with a desired client device with a simple and intuitive operation.

BRIEF DESCRIPTION OF DRAWINGS

FIG. 2 is a block diagram illustrating an exemplary configuration of a device management server according to a first embodiment of the present disclosure.

FIG. 3 is an explanatory diagram illustrating an exemplary configuration of a device management database according to a first embodiment of the present disclosure.

FIG. 6 is a flowchart illustrating exemplary information processing conducted by a communication system according to a first embodiment of the present disclosure.

DETAILED DESCRIPTION

Hereinafter, exemplary client devices according to a first embodiment of the present disclosure will be described in the following order, with reference to the drawings.
1. First embodiment (example of specifying pairing target by using dictionary image)
2. Second embodiment (example of specifying pairing target by controlling output range of wireless communication radio waves)
<1. First Embodiment>

First, an exemplary communication system to which is applied a client device according to a first embodiment of the present disclosure will be described in the following order.
1-1. Exemplary configuration of communication system
1-2. Exemplary configuration of device management server
1-3. Exemplary configuration of mobile phone client device
1-4. Exemplary configuration of television receiver
1-5. Exemplary information processing in communication system
1-6. Modifications
[1-1. Exemplary Configuration of Communication System]

Figure 1:
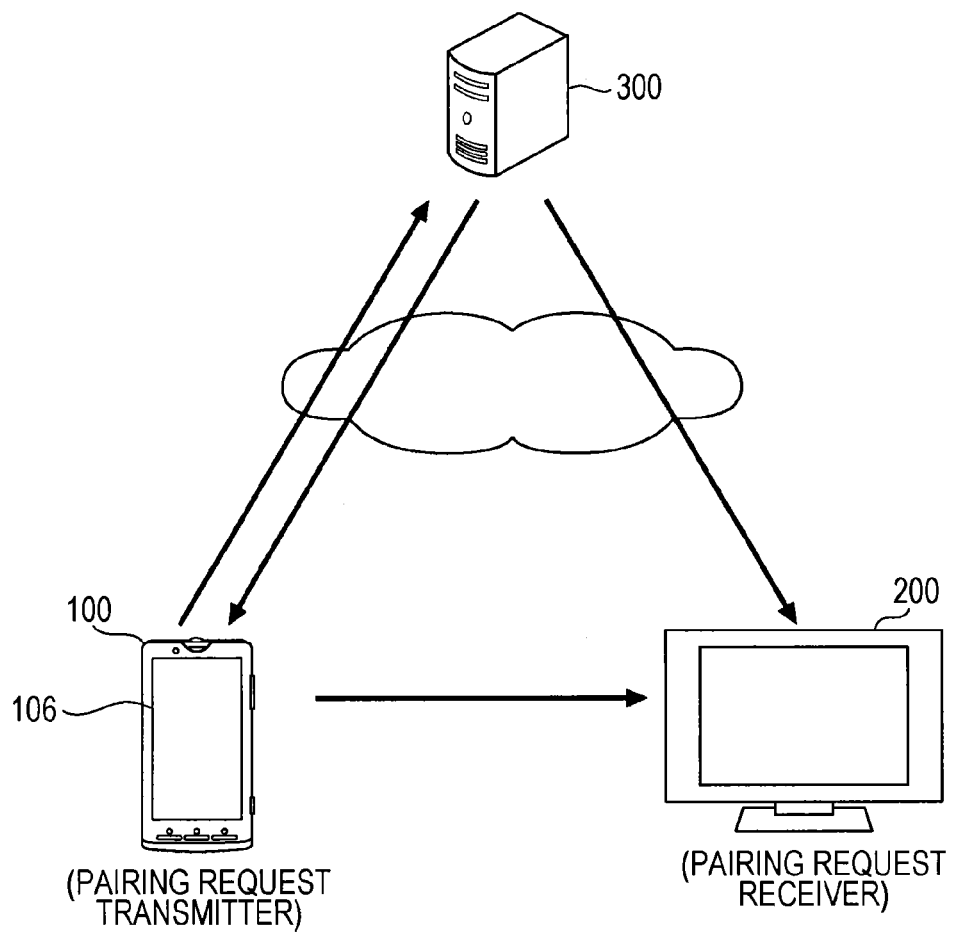
FIG. 1 is a schematic diagram illustrating an exemplary configuration of a communication system according to a first embodiment of the present disclosure.

The communication system 1 illustrated in FIG. 1 is composed of a mobile phone client device 100, a television receiver 200, and a device management server 300. The mobile phone client device 100 is configured to be able to connect to the Internet via a wireless base station, transmitting and receiving data with the device management server 300 via the Internet.

The mobile phone client device 100 is also provided with functions for communicating wirelessly, transmitting and receiving data with the television receiver 200 via wireless communication. Wireless communication protocols such as Bluetooth, Wi-Fi direct, Wireless HD (High Definition), WiGig (Wireless Gigabit), WHDI (Wireless Home Digital Interface), infrared, and NFC (Near-Field Communication) are applicable, for example. The mobile phone client device 100 is provided with a display unit 106 realized by a LCD (Liquid Crystal Display) or organic EL (Electro Luminescence), etc. On the display unit 106, images captured by an imaging unit not illustrated, etc. are displayed. The television receiver 200 likewise includes functions for communicating wirelessly, transmitting and receiving data with the mobile phone client device 100 via such wireless communication. Note that although an example applying a mobile phone client device 100 and a television receiver 200 as the target of wireless communication is being given, an embodiment is not limited thereto. Other client devices such as personal computers, tablet devices, game consoles, and audio players are also applicable, as long as the device is provided with Internet communication functions and wireless communication functions.

In this embodiment, during wireless communication between the mobile phone client device 100 and the television receiver 200, the mobile phone client device 100 is taken to be that which requests a connection, or in other words the pairing request transmitter, while the television receiver 200 is taken to be the pairing request receiver.

In the case of communicating by Bluetooth, for example, in techniques of the related art the connection requester detects any Bluetooth-compatible devices existing within communication range, and a pairing request is transmitted from the connection requester device to a detected device using the detected information. In this embodiment, the mobile phone client device 100 (i.e., the connection requester) queries the device management server 300 for communication-ready devices instead of detecting communication-ready devices. Then, the mobile phone client device 100 (i.e., the connection requester) issues a pairing request to the television receiver 200 using information transmitted from the device management server 300 in response to the query. Specification of a desired pairing partner is conducted in a state where the imaging unit of the mobile phone client device 100 is active, and where the mobile phone client device 100 is held up such that the screen of the television receiver 200 appears on the display unit 106.

The device management server 300 is provided with functions for communicating with the Internet, and additionally includes a device management database not illustrated. In the device management database, information regarding client devices such as the mobile phone client device 100 and the television receiver 200 are managed in association with user IDs (identifiers).

[1-2. Exemplary Configuration of Device Management Server]

FIG. 2 is a block diagram illustrating an exemplary configuration of the device management server 300. The device management server 300 includes a storage unit 310 consisting of a HDD (Hard Disk Drive) or SSD (Solid-State Drive), etc., a controller 320 consisting of a CPU (Central Processing Unit), etc., and a transmit/receive signal processor 330 that communicates with the Internet. A device management database Db is set up in the storage unit 310.

FIG. 3 is a diagram illustrating an exemplary table configuration of the device management database Db. The device management database Db consists of "User ID", "Dictionary Image", "Connection Method", and "Device Information" fields. The user ID refers to an arbitrary identifier assigned to each client device by its user. In FIG. 3 illustrates an example where "user A" and "user B" are registered as user IDs.

Identical user IDs may also be applied to a plurality of different client devices. For example, a user may apply identical user IDs to a client device group among which data exchange via Bluetooth or wireless LAN is desired. FIG. 3 illustrates an example where the same user ID "user A" has been applied to a client device with the MAC address "12:23:34:45:56:67" and a client device with the MAC address "72:73:34:45:56:67".

A dictionary image is an image assigned one-to-one to each client device. Although it may be configured such that images are individually registered by users, the device management server 300 may also automatically assign arbitrary images to each client device. In "Connection Method", a wireless communication protocol supported by that device is stated. For example, it is stated that "IEEE 802.11a" and "Bluetooth" are the connection methods for the client device assigned with the dictionary image Dl. Also, it is stated that "Bluetooth" is the connection method for the client device assigned with the dictionary image D2, and it is stated that "IEEE 802.11b" is the connection method for the client device assigned with the dictionary image D3.

In "Device Information", client identification information unique to each client device is stated. An SSID (Service Set IDentifier) is stated for the client device able to communicate by IEEE 802.11b, while MAC addresses are stated for the Bluetooth-compatible client devices.

Although it may be configured such that users manually register data in the device management database Db, it may also be configured such that data is automatically registered in the device management server 300. For example, it may be configured such that when initially setting up each client device or when activating a given application for the first time, etc., a message is displayed on the display screen, etc. of the client device, the message asking to transmit client identification information and wireless communication protocols supported by the client device to a server. Then, if the user's consent is obtained, the information is transmitted to the device management server 300 via the Internet and registered in "Connection Method" and "Device Information" in the device management database Db.

Upon receiving a request querying communication-ready devices from the mobile phone client device 100 (i.e., the connection requester), the device management server 300 extracts a user ID included in that request. Then, information managed in association with the extracted user ID is extracted from the device management database Db, and a "device management list" is created. The created device management list is transmitted to the mobile phone client device 100.

In addition to this, the device management server 300 also conducts a process of transmitting dictionary images associated with the extracted user ID in the device management database Db to the client devices associated with the dictionary images. A service such as C2DM (Cloud to Device Messaging), for example, may be used as the system for pushing data from the device management server 300 to the mobile phone client device 100. A client device that receives a dictionary image transmitted from the device management server 300, such as the television receiver 200 illustrated in FIG. 1, for example, causes the received dictionary image to be displayed on the display screen, etc. of its own display unit. An exemplary configuration of a television receiver 200 as a client device will be later discussed with reference to FIG. 5.

[1-3. Exemplary Configuration of Mobile Phone Client Device]

Figure 4:
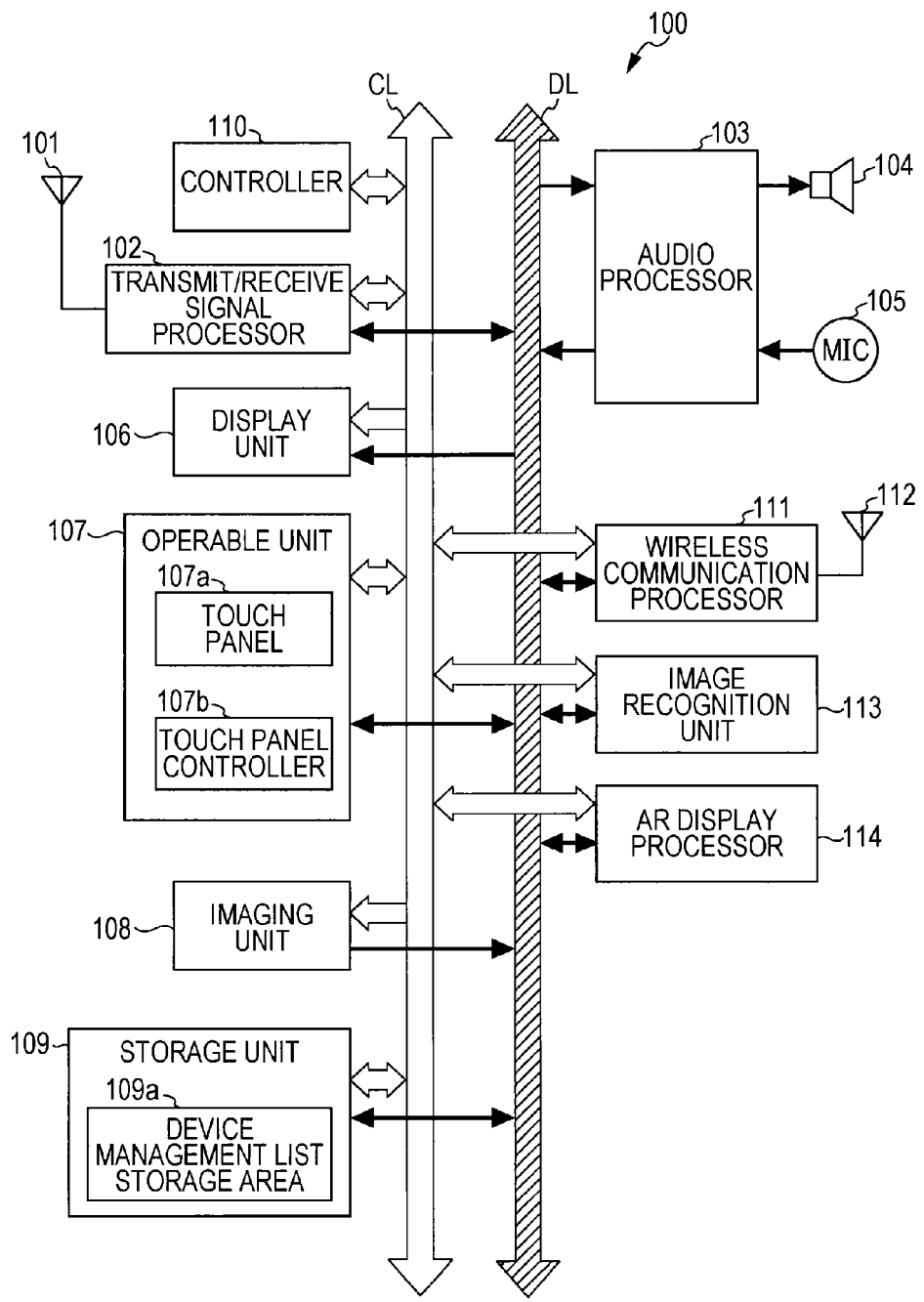
FIG. 4 is a block diagram illustrating an exemplary configuration of a mobile phone client device according to a first embodiment of the present disclosure.

Next, an exemplary configuration of a mobile phone client device 100 will be described with reference to FIG. 4. The mobile phone client device 100 is provided with a an antenna 101 that transmits and receives radio waves with a wireless telephone base station, a transmit/receive signal processor 102 to which the antenna 101 is connected, and a controller 110. Also provided are an audio processor 103, a speaker 104, and a microphone 105.

The transmit/receive signal processor 102 wirelessly communicates with a wireless telephone base station, under control by the controller 110. During audio telephony, audio data included in data received by the transmit/receive signal processor 102 is supplied to the audio processor 103. Then, an audio data decoding process is conducted by the audio processor 103 and an analog audio signal is obtained. The analog audio signal obtained by the audio processor 103 is supplied to the speaker 104 and output as audio. An audio signal obtained by the microphone 105 picking up sound is likewise supplied to the audio processor 103 and encoded into audio data in a given encoding format by the audio processor 103. Then, the obtained audio data is supplied to the transmit/receive signal processor 102 and emitted as wireless radio waves via the antenna 101.

During data communication, control is applied to connect to the Internet via a wireless telephone base station and transmit/receive data with a device management server 300 (see FIG. 2). Processors such as the transmit/receive signal processor 102 and the audio processor 103 exchange control data with the controller 110 via a control line CL, and also transmit data via a data line DL.

The mobile phone client device 100 is also provided with a display unit 106 and an operable unit 107, as discussed earlier. Display on the display unit 106 is controlled by the controller 110. Information required when placing or receiving telephone calls, information such as email addresses and message, images obtained by an Internet connection, and information obtained as a result of executing various functions provided in the mobile phone client device 100, etc. is displayed on the display unit 106. For example, images captured by the imaging unit 108 discussed later, etc. are displayed.

The operable unit 107 is composed of buttons and a touch panel 107a, etc. A touch panel controller 107b controls the touch panel 107a. For example, in the case where there is operation input from a user on the touch panel 107a, the touch panel controller 107b generates an instruction signal according to the details of the input operation, and supplies it to the controller 110.

The imaging unit 108 is provided with, for example, an image sensor consisting of a CCD (Charge-Coupled Device) or CMOS (Complementary Metal-Oxide-Semiconductor), etc., photoelectrically converts subject light focused on the light-receiving surface thereof via a lens not illustrated, and outputs an image signal. Image signal generation is conducted at a given frame, such as 30 fps (frames per second), for example, and generated image signals are stored as recorded images in the storage unit 109 discussed later or elsewhere. The lens of the imaging unit 108 is taken to be provided on the side of the case of the mobile phone client device 100 opposite to the side where the display unit 106 is disposed.

Also, in the present embodiment, an image signal obtained by the imaging unit 108 is supplied to an image recognition unit 113 discussed later during the phase where the mobile phone client device 100 transmits a pairing request. In the present embodiment, when issuing a pairing request, the user is made to hold up the mobile phone client device 100 to the desired pairing partner device. More specifically, the user is made to adjust the position and angle of the mobile phone client device 100 such that the display screen of the desired target device to which a pairing request is to be transmitted appears on the screen of the display unit 106. As a result of doing such an operation, an image depicting the display screen of the desired pairing partner device is captured by the imaging unit 108.

The controller 110 consists of a microprocessor, etc., and conducts communication control, audio processing and its control, image processing and its control, various other signal processing, and control of respective units. The storage unit 109 is connected to the controller 110 via the control line CL and the data line DL.

Various data needed by the mobile phone client device 100 is stored in the storage unit 109. A device management list transmitted from the device management server 300 is stored in the device management list storage area 109a of the storage unit 109. Also stored in the storage unit 109 are images or video captured by the imaging unit 108, and audio files, image files, and video files, etc. downloaded from various servers via the Internet.

The mobile phone client device 100 is also provided with a wireless communication processor 111 to which an antenna 112 is connected, an image recognition unit 113, and an AR (Augmented Reality) display processor 114. The wireless communication processor 111 wirelessly communicates with a nearby device via the antenna 101 by a procedure based on a given communication protocol. In the present embodiment, the wireless communication processor 111 is taken to wirelessly communicate according to protocols such as IEEE 802.11 and Bluetooth discussed earlier, for example.

The image recognition unit 113 conducts image recognition, taking image signals input from the imaging unit 108 at a frame rate of 30 fps or the like as input images. Specifically, an image (first image) according to an image signal input from the imaging unit 108 is scanned, and it is determined whether or not a pattern exists in that image that is identical to a dictionary image (second image) in the device management list stored in the storage unit 109. Then, the coordinates of the detected image are supplied to the AR display processor 114 in the case where an identical pattern is detected.

In the case where the user holds up the mobile phone client device 100 to the television receiver 200 (i.e., the desired pairing partner) as discussed earlier, a dictionary image displayed on the display unit of the television receiver 200 will be contained in the "first image". In other words, in the image recognition unit 113 it will be determined that the dictionary image displayed on the display unit of the television receiver 200 matches a dictionary image in the device management list stored in the storage unit 109.

Both dictionary images have been transmitted from the device management server 300, and are managed in association with the same user ID in the device management database Db in the device management server 300.

The AR display processor 114 generates a virtual object and applies control to display the generated virtual object on top of, adjacent to, etc. an image detected by the image recognition unit 113. A UI (User Interface), etc. that makes it easier to select files when transferring files to another client device by wireless communication may be displayed as the virtual object. For example, a musical note symbol indicating music files or a mountain symbol indicating images may be displayed. Then, in the case of receiving an operation selecting any of the above by the user, a process of displaying the filenames of various files stored in the storage unit 109, etc. is conducted.

[1-4. Exemplary Configuration of Television Receiver]

Figure 5:
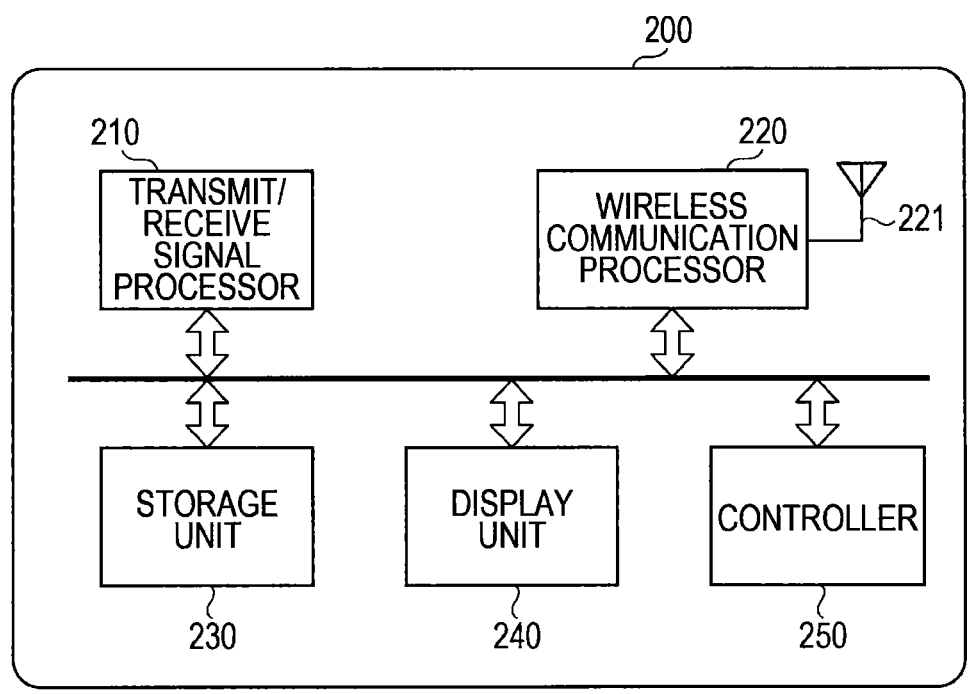
FIG. 5 is a block diagram illustrating an exemplary configuration of a television receiver according to a first embodiment of the present disclosure.

Next, an exemplary configuration of a television receiver 200 as a client device that receives a pairing request will be described with reference to FIG. 5. However, in order to simplify explanation, only the portions conducting processes related to an information processing method of the present disclosure have been extracted and depicted in FIG. 5, whereas depiction of functions included in a typical television receiver, such as a tuner and signal processing circuits, has been omitted.

The television receiver 200 is provided with a transmit/receive signal processor 210, a wireless communication processor 220, a storage unit 230, a display unit 240, and a controller 250. The transmit/receive signal processor 210 connects to the Internet and receives data transmitted from a device management server 300 (see FIG. 2).

The wireless communication processor 220 wirelessly communicates with a nearby device via an antenna 221 by a procedure based on a given communication protocol.

Specifically, in the case of receiving a pairing request transmitted from a mobile phone client device 100, a reply is transmitted to the mobile phone client device 100 with information required for pairing. Information required for pairing refers to information such as service (profile) information, link keys, and PIN codes, to take the case of communicating by Bluetooth as an example. Additionally, once a connection is established after a successful pairing, the wireless communication processor 220 transmits and receives data via that connection.

The storage unit 230 consists of an HDD, Blu-ray (registered trademark) disc, etc., and stores information such as television broadcast programs received by a tuner not illustrated, and audio files, image files, and video files, etc. downloaded from various servers via the Internet. Data received by the wireless communication processor 220 via wireless communication is also stored.

The display unit 240 consists of an LCD or PDP (Plasma Display Panel), organic EL, etc., and displays programs received by the tuner and various data stored in the storage unit.

The controller 110 consists of a microprocessor, etc., and conducts communication control, audio processing and its control, image processing and its control, various other signal processing, and control of respective units. In the case where a dictionary image is transmitted from the device management server 300, control is applied to display the received dictionary image on the display unit 240.

[1-5. Exemplary Information Processing in Communication System]

Next, an exemplary information processing flow will be described with reference to FIG. 6 for a communication system 1 that includes a mobile phone client device 100, a television receiver 200, and a device management server 300 discussed above. First, a request querying for any pairable devices is transmitted from the mobile phone client device 100 to the device management server 300 (step S1). Information on the user ID assigned to the mobile phone client device 100 is also included in the request transmitted to the device management server 300 at this point.

At the device management server 300 that receives the request, the user ID is extracted from the request under control by the controller 320 (see FIG. 2). Then, the controller 320 generates a device management list by extracting information associated with the user ID in the device management database Db (step S2). For example, in the case where the user ID transmitted from the mobile phone client device 100 is "user A", a device management list is generated by extracting only the information on the first and second lines managed in association with "user A" of the device management database Db illustrated in FIG. 3.

Returning to FIG. 6 and continuing the description, the controller 320 of the device management server 300 causes the generated device management list to be transmitted to the mobile phone client device 100 (i.e., the request origin) via the transmit/receive signal processor 330 (step S3).

At the mobile phone client device 100 (see FIG. 4) that receives the device management list, the device management list is stored in the device management list storage area 109a in the storage unit 109 under control by the controller 250 (step S4).

Subsequently, imaging is started by the imaging unit 108 (step S5), and an image recognition process is started by the image recognition unit 113 (step S6). At this point, the user performs an operation of holding up the screen of the display unit 106 of the mobile phone client device 100 to the television receiver 200 (i.e., the desired pairing target device).

At the device management server 300, in addition to transmitting a device management list to the mobile phone client device 100, a process of transmitting dictionary images associated with the user ID to each client device associated with the user ID is also conducted (step S7). In other words, the dictionary image D1 associated with "user A" in the device management database Db illustrated in FIG. 3 is transmitted to the client device with the MAC address "12:23:34:45:56:67". Also, the dictionary image D2 associated with "user A" is transmitted to the client device with the MAC address "72:73:34:45:56:67".

Returning to FIG. 6 and continuing the description, at the television receiver 200 that receives a dictionary image, control causing the received dictionary image to be displayed on the screen of the display unit 240 (see FIG. 5) is conducted under control by the controller 250 (step S8). If the television receiver 200 is taken to be the client device with the MAC address "72:73:34:45:56:67" associated with "user A" in the device management database Db illustrated in FIG. 3, then the dictionary image D2 is displayed on the screen. Meanwhile, at the mobile phone client device 100 (i.e., the pairing requester), it is determined in the image recognition unit 113 whether or not a pattern exists in a first image input from the imaging unit 108 that is identical to the dictionary image (second image) in the device management list stored in the storage unit 109 (step S9). At this point, since the screen of the display unit 106 of the mobile phone client device 100 is being held up to the television receiver 200 by the user, an image signal depicting the display unit 240 of the television receiver 200 as its subject is generated in the imaging unit 108 of the mobile phone client device 100.

In the case where it is determined in step S9 that a dictionary image has been detected, device information (client identification information) associated with the dictionary image in the device management list is used to transmit a pairing request to the client device having that device information (step S10). In other words, a pairing request is transmitted to the television receiver 200 with the MAC address "72:73:34:45:56:67". According to the device management database Db illustrated in FIG. 3, the connection method of the client device with the MAC address "72:73:34:45:56:67" is Bluetooth, and thus a pairing request is transmitted using the Bluetooth protocol.

Figure 7A:
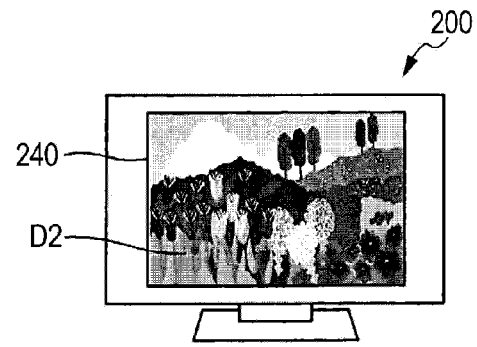
FIGS. 7A-7C are explanatory diagrams illustrating an exemplary Augmented Reality (AR) display indicating that pairing has been established, according to a first embodiment of the present disclosure.
Figure 7B:
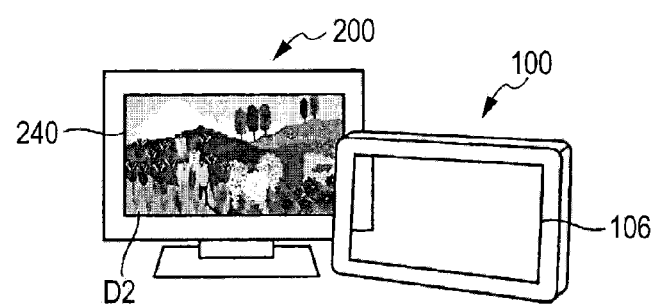
Figure 7C:
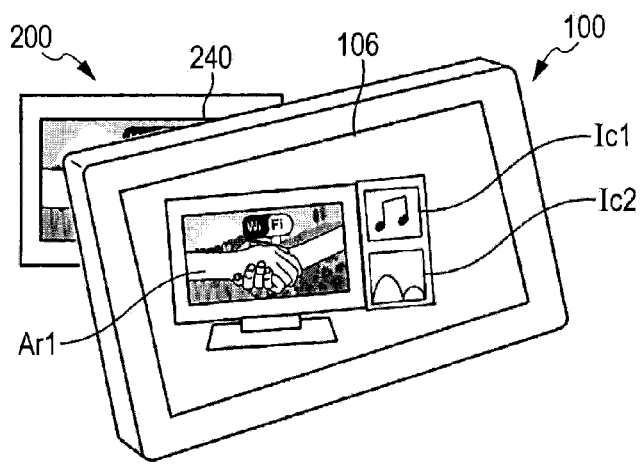

If pairing is established between the mobile phone client device 100 (i.e., the pairing requester) and the television receiver 200 (i.e., the requestee) as a result of the pairing request, an AR display of a virtual object indicating an established pairing is presented on the display screen of the mobile phone client device 100 (step S11). FIGS. 7A-7C illustrate an exemplary AR display by the mobile phone client device 100.

FIG. 7A illustrates an example where the dictionary image D2 is displayed on the screen of the display unit 240 of the television receiver 200 due to the processing in step S8 of FIG. 6. By holding up the mobile phone client device 100 such that the dictionary image D2 appears on the display unit 106 of the mobile phone client device 100 while in this state (FIG. 7B), the processing from step S6 to step S11 in FIG. 6 is conducted. Thus, a virtual object Ar1 indicating an established pairing is displayed superimposed over the dictionary image D2 on the screen of the display unit 106 of the mobile phone client device 100. Also, to the right of the dictionary image D2 is presented an AR display of an icon Ic1 and an icon Ic2 which indicate types of files stored in the mobile phone client device 100 (FIG. 7C). The position where the virtual object Ar1 is displayed may be determined at an arbitrary position based on the position where the dictionary image D2 is being displayed.

FIG. 7C also illustrates icons that indicate file types as part of the virtual object Art, and in addition, illustrates an example in which the virtual object Art is operable by touch.

For example, in the case where the user selects a musical note symbol which represents music files and which is displayed as part of the virtual object Art, music files stored in the storage unit 109 of the mobile phone client device 100 are displayed on the screen of the display unit 106 as a list, etc. Then, if an operation selecting one or more specific files therefrom is received, the one or more selected files are transmitted to the paired television receiver 200 via Bluetooth. By configuring in this way, it becomes possible to transmit various files stored in the storage unit 109 of the mobile phone client device 100 to a paired television receiver 200 with intuitive operations.

According to the embodiment of the present disclosure discussed above, pairing is automatically conducted due to the user simply holding up his or her own client device (in the example discussed above, a mobile phone client device 100) in the direction of a desired device to pair with. In other words, pairing can be easily conducted without performing complicated operations.

Also, even in the case of a plurality of nearby pairable client devices, pairing with a desired device is easily conducted simply by holding up one's own client device such that the display screen of the desired pairing partner device appears on the display screen of one's own client device. In other words, an arbitrary device can be easily chosen from among a plurality of pairable devices, without entering into a tedious procedure of selecting a desired device to pair with from among a displayed list of device names or MAC addresses.

Also, since the action of holding up one's own device in the direction of a desired pairing target device is linked to the idea of pairing with a desired device to pair with, the user is able to conduct pairing with an intuitive operation.

Furthermore, since it is configured such that file types are indicated as additional information on the virtual object Ar1 which indicates an established pairing, and also configured such that the virtual object Ar1 is operable by touch, data transfer processes conducted after pairing can also be realized with intuitive operations.

[1-6. Modifications]

In the first embodiment discussed above, an example is given in which icons representing types of files in a mobile phone client device 100 are additionally displayed as part of a virtual object that indicates an established pairing. However, an embodiment is not limited thereto. It may also be configured such that information on the connection method of the pairing target device being captured as the image subject may also be displayed as part of a virtual object, with wireless communication being conducted according to a connection method selected by the user.

Figure 8:
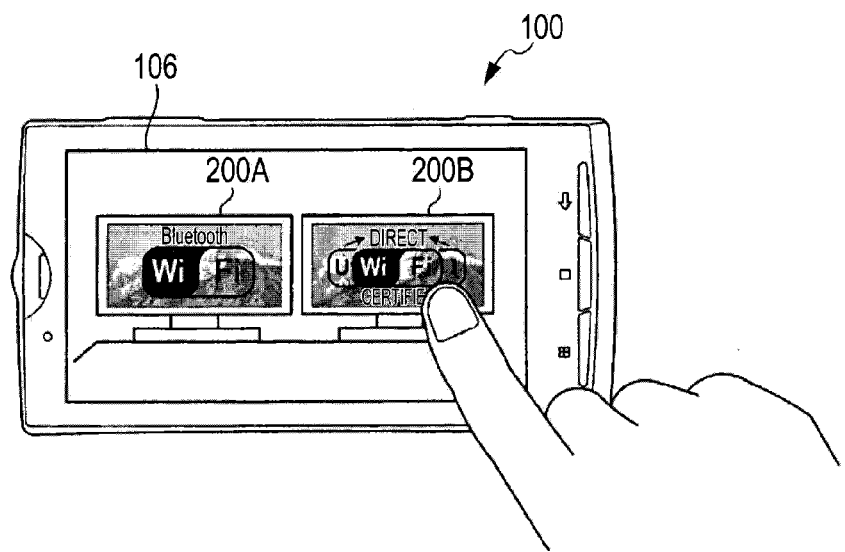
FIG. 8 is an explanatory diagram illustrating an exemplary display in the case of presenting an AR display of connection method supported by a client device, according to a modification of a first embodiment of the present disclosure.

FIG. 8 is a diagram illustrating exemplary display of a virtual object Ar2 in the case of configuring in this way. FIG. 8 illustrates a screen on the display unit 106 of a mobile phone client device 100, in which two television receivers 200A and 200B appear on-screen. Additionally, "Bluetooth" and "Wi-Fi" symbols are displayed as AR over the television receiver 200A, while a "Wi-Fi Direct" symbol is displayed as AR over the television receiver 200B.

These AR displays represent communication protocols supported by the television receivers 200. The displays can be generated on the basis of connection method information stated in a device management list received from a device management server 300.

By configuring in this way, the user's preferred communication protocol can be selected with intuitive operations in the case where the desired device to pair with supports multiple communication protocols.

It may also be configured such that information on services providable by the pairing target device being captured as the image subject is displayed as a virtual object, enabling the user to select a wireless communication peer by referring to this service information.

Figure 9:
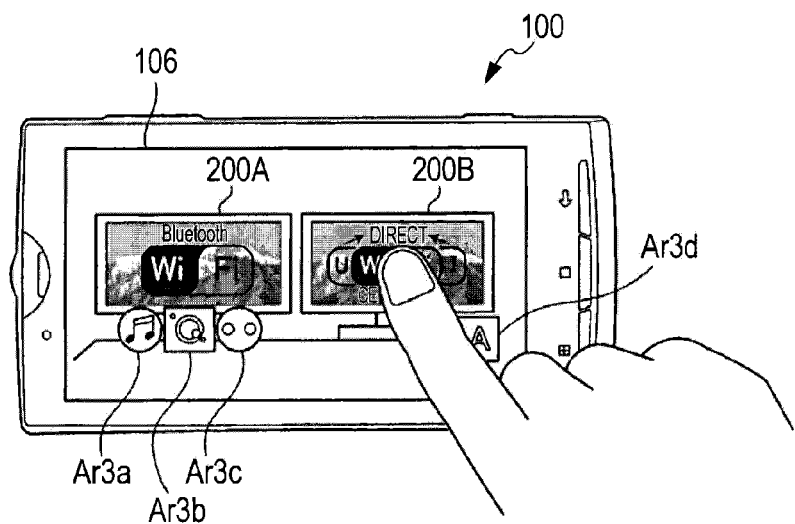
FIG. 9 is an explanatory diagram illustrating an exemplary display in the case of presenting an AR display of services that a device is able to provide, according to a modification of a first embodiment of the present disclosure.

FIG. 9 is a diagram illustrating exemplary display of a virtual object Ar3 in the case of configuring in this way. FIG. 9 likewise illustrates a screen on the display unit 106 of a mobile phone client device 100, in which two television receivers 200A and 200B appear on-screen. Additionally, directly below the spot where the television receiver 200A appears, virtual objects Ar3a, Ar3b, and Ar3c are displayed as AR representing services providable by the television receiver 200A. Also, a virtual object Ar3d is displayed as AR representing a service providable by the television receiver 200B.

"Services providable by the television receiver 200A" refers to various applications and functions stored in the storage unit 230 (see FIG. 5) of the television receiver 200A.

These applications and functions are not limited to being stored in the storage unit 230, and may also be acquirable from the Internet or a cloud computing environment via the transmit/receive signal processor 210.

By configuring in this way, it becomes possible for the user to select a device able to provide a service or function that he or she wants to use, for example, as the target device to pair with.

<2. Second Embodiment>

Next, a second embodiment of the present disclosure will be described in the following order and with reference to the drawings.

2-1. Exemplary configuration of communication system
2-2. Exemplary configuration of mobile phone client device
2-3. Exemplary processing in mobile phone client device

[2-1. Exemplary Configuration of Communication System]

Figure 10:
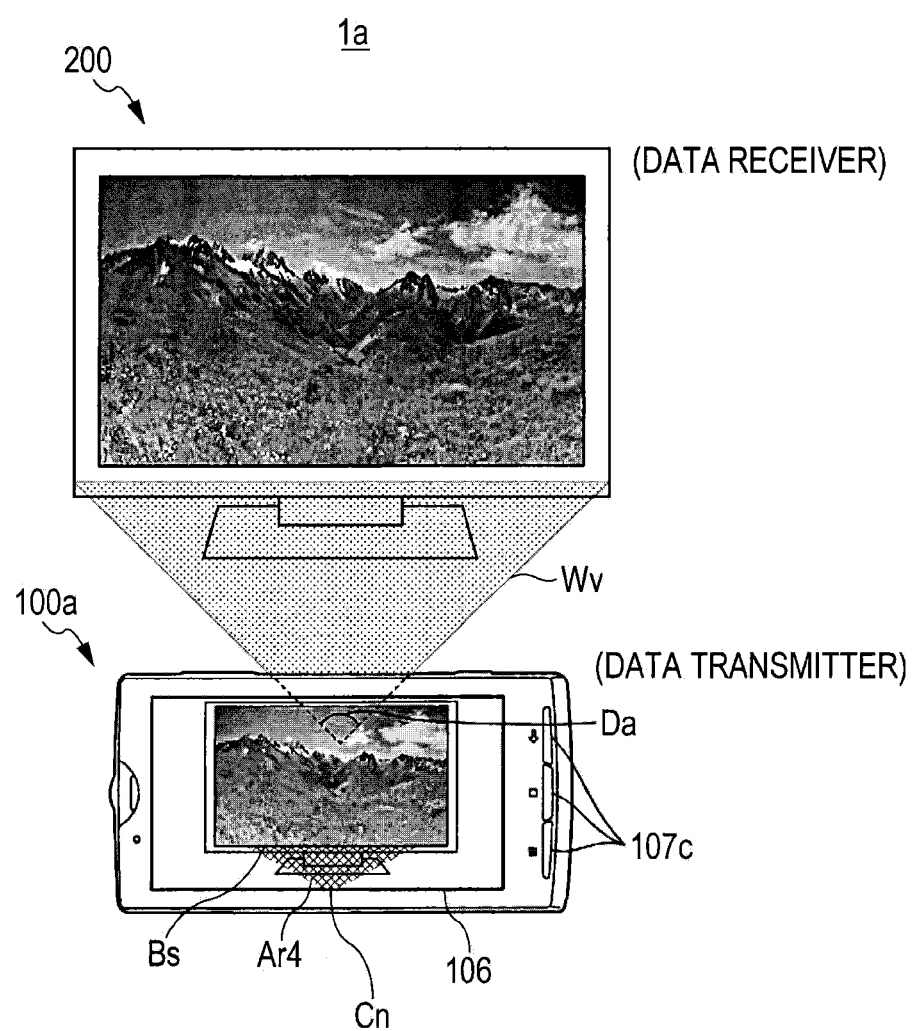
FIG. 10 is a schematic diagram illustrating an exemplary configuration of a communication system according to a second embodiment of the present disclosure.

First, an exemplary schematic configuration of a communication system 1a according to the present embodiment will be described with reference to FIG. 10. In FIG. 10, like reference symbols are given to portions corresponding to FIG. 1, and duplicate description thereof will be reduced or omitted. The communication system 1a illustrated in FIG. 10 is composed of a mobile phone client device 100a and a television receiver 200. In the present embodiment, during wireless communication between the mobile phone client device 100 and the television receiver 200, the mobile phone client device 100 is taken to be that which requests a connection, or in other words the pairing request transmitter, while the television receiver 200 is taken to be the pairing request receiver.

Note that although an example is being given herein in which a communication system 1a is composed of a mobile phone client device 100a and a television receiver 200, an embodiment is not limited to, similarly to the first embodiment. Other client devices such as personal computers, tablet devices, game consoles, and audio players are also applicable, as long as the device is provided with wireless communication functions.

In this embodiment, AR technology is likewise used as a tool making it easier to specify a desired target to pair with. Similarly to the first embodiment, specification of a desired pairing partner is conducted by holding up a mobile phone client device 100 such that a television receiver 200 appears on a display unit 106 while in a state where an imaging unit 108 of the mobile phone client device 100 (see FIG. 2) is active.

In the present embodiment, the radiation angle (spread angle) of a radio wave (beacon) emitted from a request source is restricted to a given angle or less when issuing a pairing request, and in addition, the range anticipated as the radio wave coverage once the spread angle has become the given angle or less is displayed on-screen as AR. FIG. 10 illustrates a state where a virtual object Ar4 representing the coverage of a radio wave Wv is displayed on the screen of the display unit 106 of the mobile phone client device 100a.

The virtual object Ar4 representing the coverage of the radio wave Wv is displayed as a triangle on the screen of the display unit 106 of the mobile phone client device 100a. Herein, among the edges constituting the triangle, the edge that overlaps the bottom part of the screen of the television receiver 200 appearing on-screen is designated the base Bs for convenience. Also, the point where the two edges other than the base intersect is designated the vertex Cn. The position of this vertex Cn is set at a position near or at the center of the edge parallel to and close to the ground from among the edges constituting the display unit 106, for example. In the example illustrated in FIG. 10, since the mobile phone client device 100a is being held horizontally by the user, the long edges of the display unit 106 is parallel to the ground. Additionally, of the two long edges, the vertex Cn of the virtual object Ar4 is positioned at or near the center of the edge closer to the ground.

The vertex Cn of this triangle abstractly represents the position of the emission source of the radio wave Wv. The radio wave Wv may be emitted from a position near where the lens of the imaging unit 108 is provided on the side of the case of the mobile phone client device 100a opposite to the side where the display unit 106 is provided, for example. Also, the angle Ag formed by the two edges forming the vertex Cn of the triangle abstractly represents the spread angle Da of the radio wave Wv. By displaying on-screen a virtual object Ar4 with such characteristics, the user is able to intuitively ascertain the spread angle Da and the coverage of a radio wave Wv (more generally, the propagation direction of a radio wave Wv) emitted from his or her own device when issuing a pairing request.

While in a state where such a virtual object Ar4 is displayed, the user can adjust the direction and angle of the device such that a desired pairing target device is positioned within the coverage area of the radio wave Wv represented by the virtual object Ar4, thereby making it possible to restrict the target to the desired device and transmit a pairing request. Furthermore, by making the spread angle Da itself be controllable with respect to the radio wave Wv that transmits a pairing request, and by also varying the angle Ag of the vertex Cn of the virtual object Ar4 to match the actual spread angle Da, it becomes possible to more easily pair with a desired device, even in cases where a plurality of devices exist nearby.

In order to achieve such an object, it is necessary to make the angle Ag of the vertex Cn of the virtual object Ar4 correspond to the spread angle Da of the radio wave Wv actually being emitted. Although making a correspondence is necessary, it is not necessary to faithfully recreate the actual spread angle Da of the radio wave Wv. The virtual object Ar4 is displayed superimposed over an image captured by the imaging unit 108, and the range framed as a captured image is determined by the angle of view of the imaging unit 108. Consequently, if the angle Ag of the vertex Cn of the virtual object Ar4 which represents the spread angle Da of the radio wave Wv is expressed as a value within the range of the angle of view of the imaging unit 108, it becomes easy for the user to visually understand the spread angle Da expressed by the angle Ag.

For example, in the case where the imaging unit 108 has a 50° angle of view, a correspondence is made between 50° for the spread angle Da of an actual radio wave Wv and 180° for the angle Ag of the vertex Cn of the virtual object Ar4. If set in this way, a virtual object Ar4 with a 180° angle Ag of the vertex Cn will be displayed in the case where the spread angle of the actual radio wave Wv is 50°. In other words, the virtual object Ar4 that represents the radio wave coverage will be expressed not as a triangle, but as a rectangle filling a band from the bottom part of the screen of the display unit 106 of the mobile phone client device 100a illustrated in FIG. 10 to the bottom part of the screen of the television receiver 200 appearing on-screen, for example. Even in such cases, however, the virtual object Ar4 may be displayed as an ellipse (or circle) centered about the vertex Cn representing the radio wave emission source, in order to make it easy for the user to visually understand the radio wave coverage.

Also, although the vertex Cn representing the radio wave emission source may be positioned at or near the center of one of the edges constituting the display unit 106 as illustrated in FIG. 10, the vertex Cn may also be disposed as a position that is separated from an edge in the vertical direction of the screen. However, positioning at or near the center of an edge in the edge's horizontal direction may make it easier for the user to visually understand the coverage of a radio wave Wv displayed as an virtual object Ar4.

[2-2. Exemplary Configuration of Mobile Phone Client Device]

Figure 11:
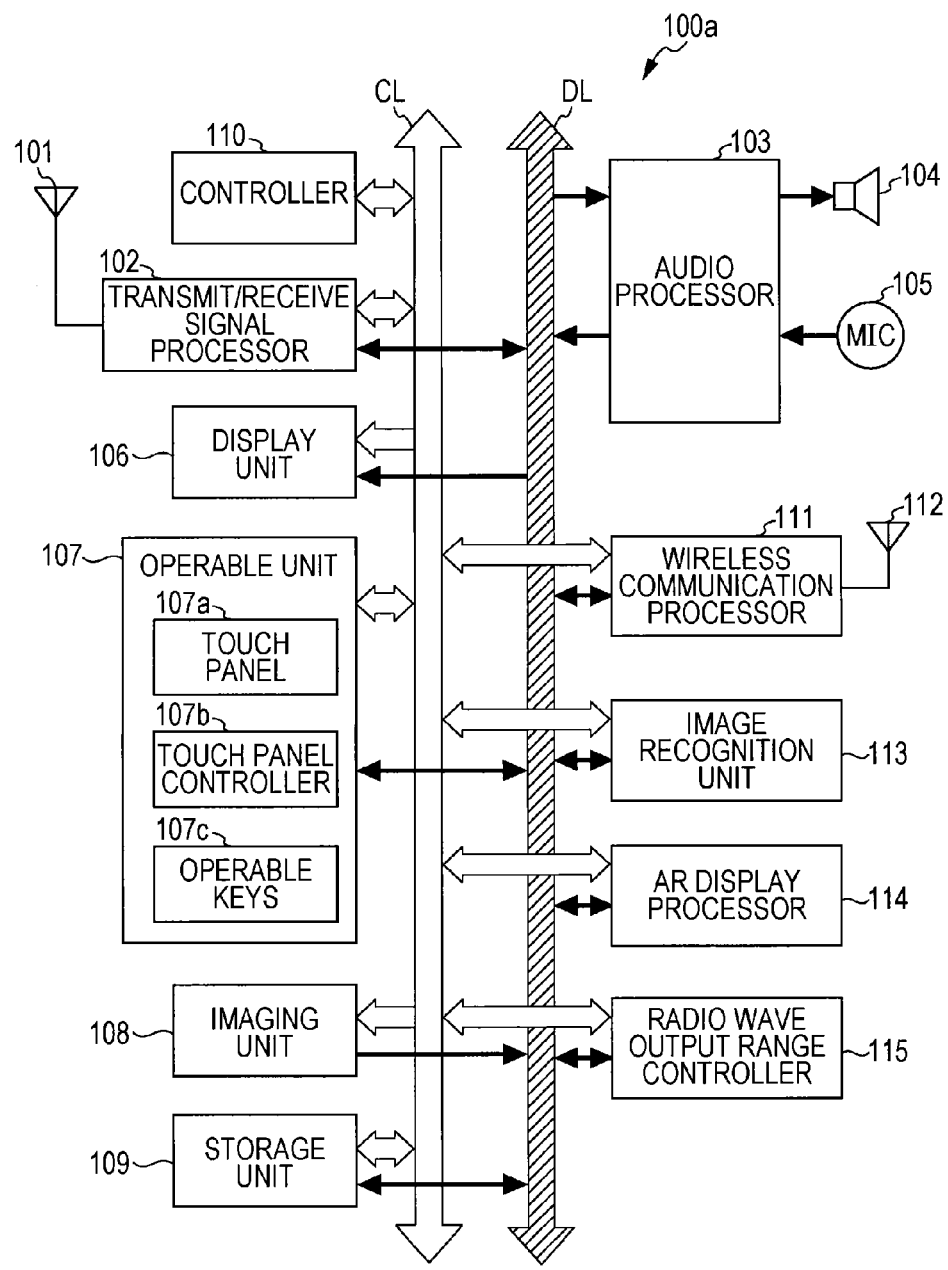
FIG. 11 is a block diagram illustrating an exemplary internal configuration of a mobile phone client device according to a second embodiment of the present disclosure.

Next, an exemplary configuration of a mobile phone client device 100a according to the present embodiment will be described with reference to the block diagram in FIG. 11. In FIG. 11, like reference symbols are given to portions corresponding to FIG. 4, and duplicate description thereof will be reduced or omitted. The mobile phone client device 100a illustrated in FIG. 11 differs from the mobile phone client device 100 illustrated in FIG. 4 in that it lacks a device management list storage area 109a, and includes a radio wave output range controller 115.

The radio wave output range controller 115 varies the spread angle Da of a radio wave Wv emitted when issuing a pairing request. More specifically, the radio wave output range controller 115 applies control to narrow the spread angle Da of the radio wave Wv in the case of receiving two or more responses to a transmitted pairing request.

[2-3. Exemplary Processing in Mobile Phone Client Device]

Next, exemplary processing by the mobile phone client device 100a according to the present embodiment will be described with reference to the flowchart in FIG. 12. First, when a wireless connection function (not illustrated) is activated on the basis of an operation on the operable unit 107, etc. (step S21), a virtual object Ar4 representing the radio wave coverage is displayed on-screen, on the basis of control by the AR display processor 114 (see FIG. 11) (step S22). At this stage, the device's direction and angle are adjusted by the user such that a desired pairing target device is positioned within the coverage area of the radio wave Wv represented by the virtual object Ar4.

Figure 13:
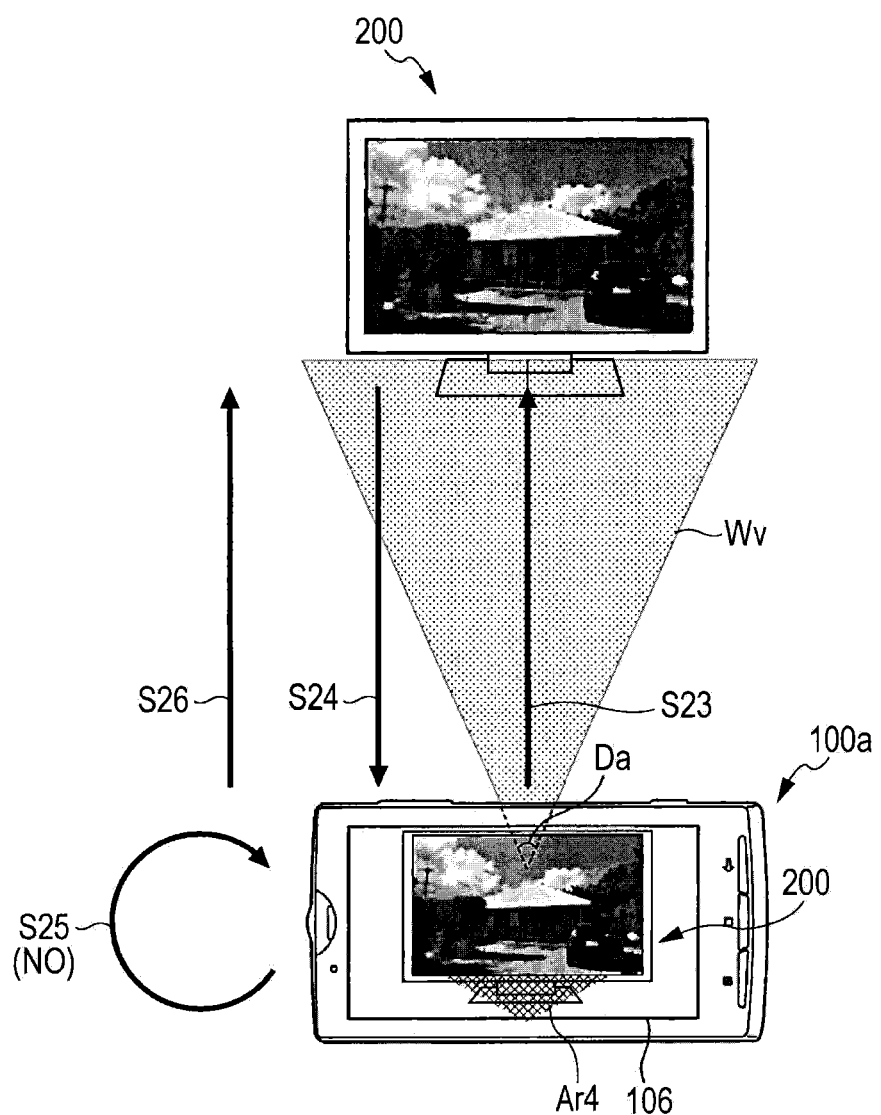
FIG. 13 is an explanatory diagram illustrating exemplary processing in the case where there is one nearby device available for pairing, according to a second embodiment of the present disclosure.

Subsequently, when a polling request for pairable devices is broadcast under control by the wireless communication processor 111 (step S23), a response to the polling request is transmitted from any devices that have received the polling request (step S24). SSID and other information is included in such responses. Then, it is determined if two or more responses to the polling request have been received (step S25). In the case where there is only one pairable device near the mobile phone client device 100a, as illustrated in FIG. 13, the number of received responses is 1, and thus "No" is selected at this point.

In this case, the SSID and other information included in the response received in step S24 is used to transmit a pairing request to the device from which the response originated (step S26). Then, a process is conducted to establish a pairing with the device that received the pairing request (step S27), and a pairing is established (step S28).

Figure 14:
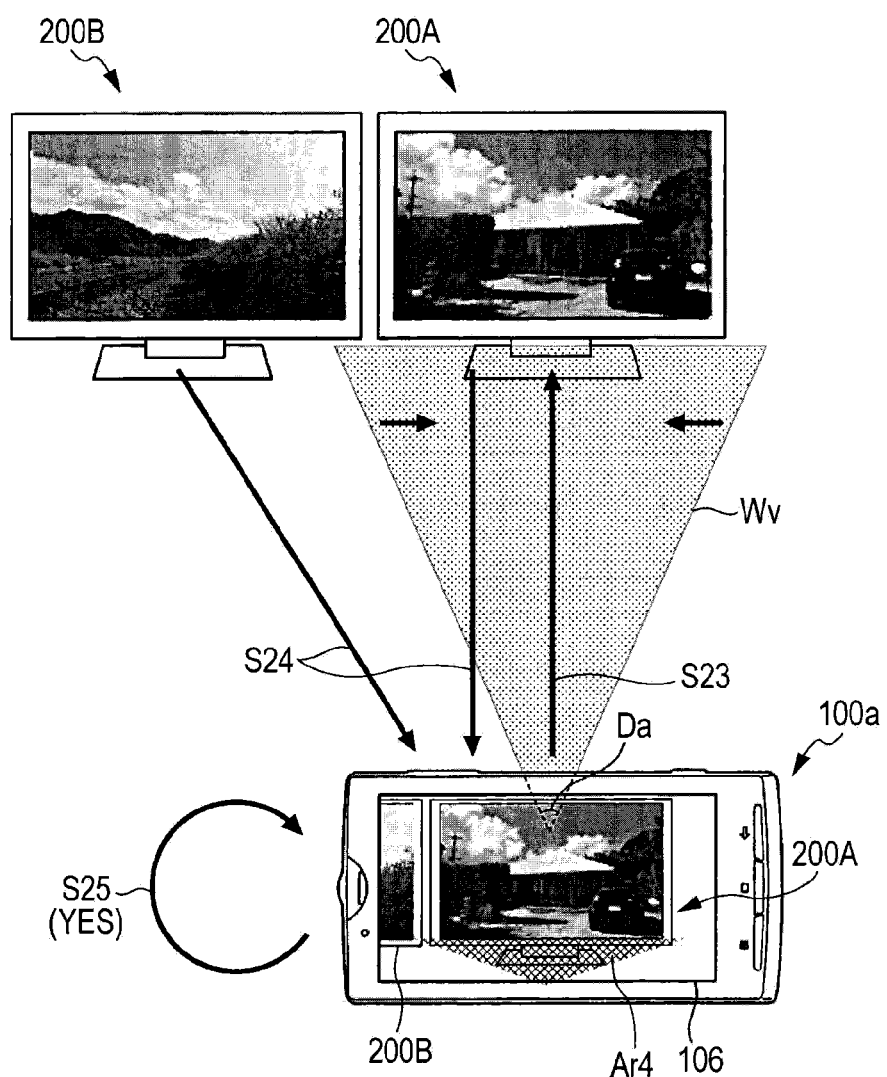
FIG. 14 is an explanatory diagram illustrating exemplary processing in the case where there are two nearby devices available for pairing, according to a second embodiment of the present disclosure.
Figure 15:
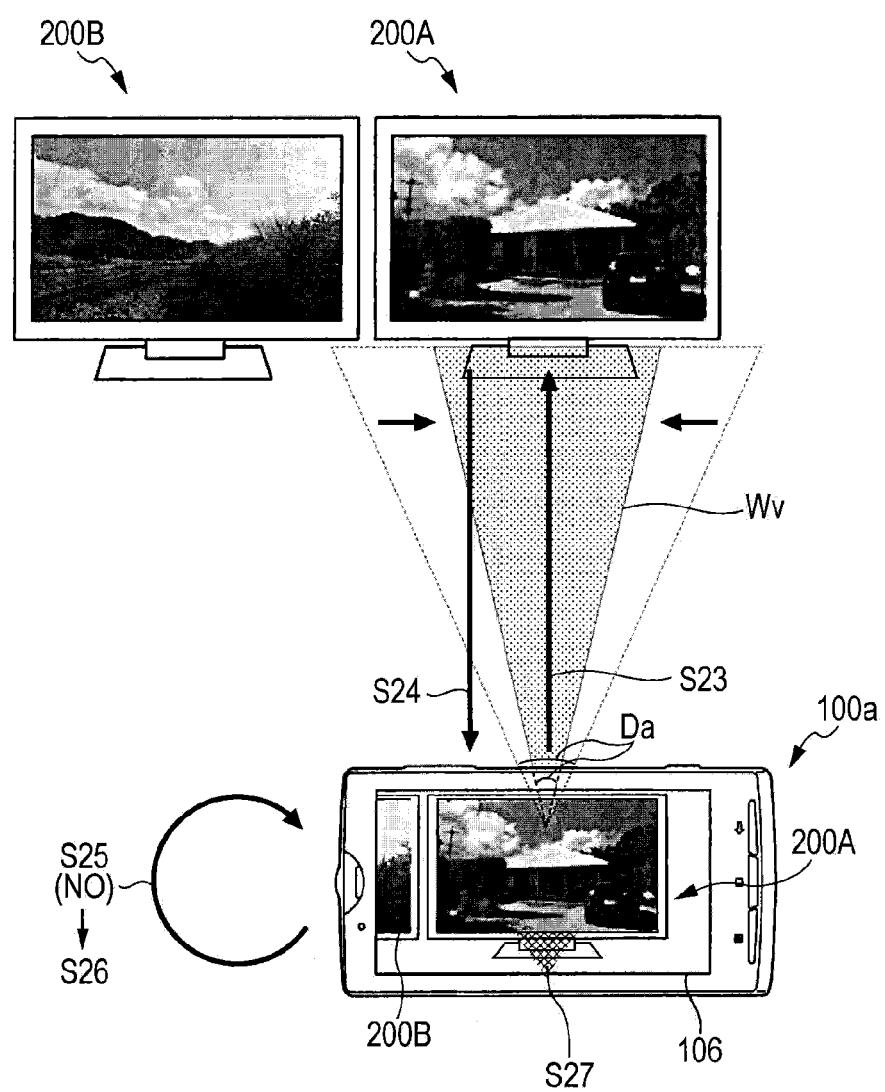
FIG. 15 is an explanatory diagram illustrating exemplary processing in the case where there are two nearby devices available for pairing, according to a second embodiment of the present disclosure.

In the case where plural pairable devices exist near the mobile phone client device 100a, as illustrated in FIG. 14 (two television receivers 200A and 200B in the example illustrated in FIG. 14), the number of responses received in step S24 also becomes plural.

Figure 12:
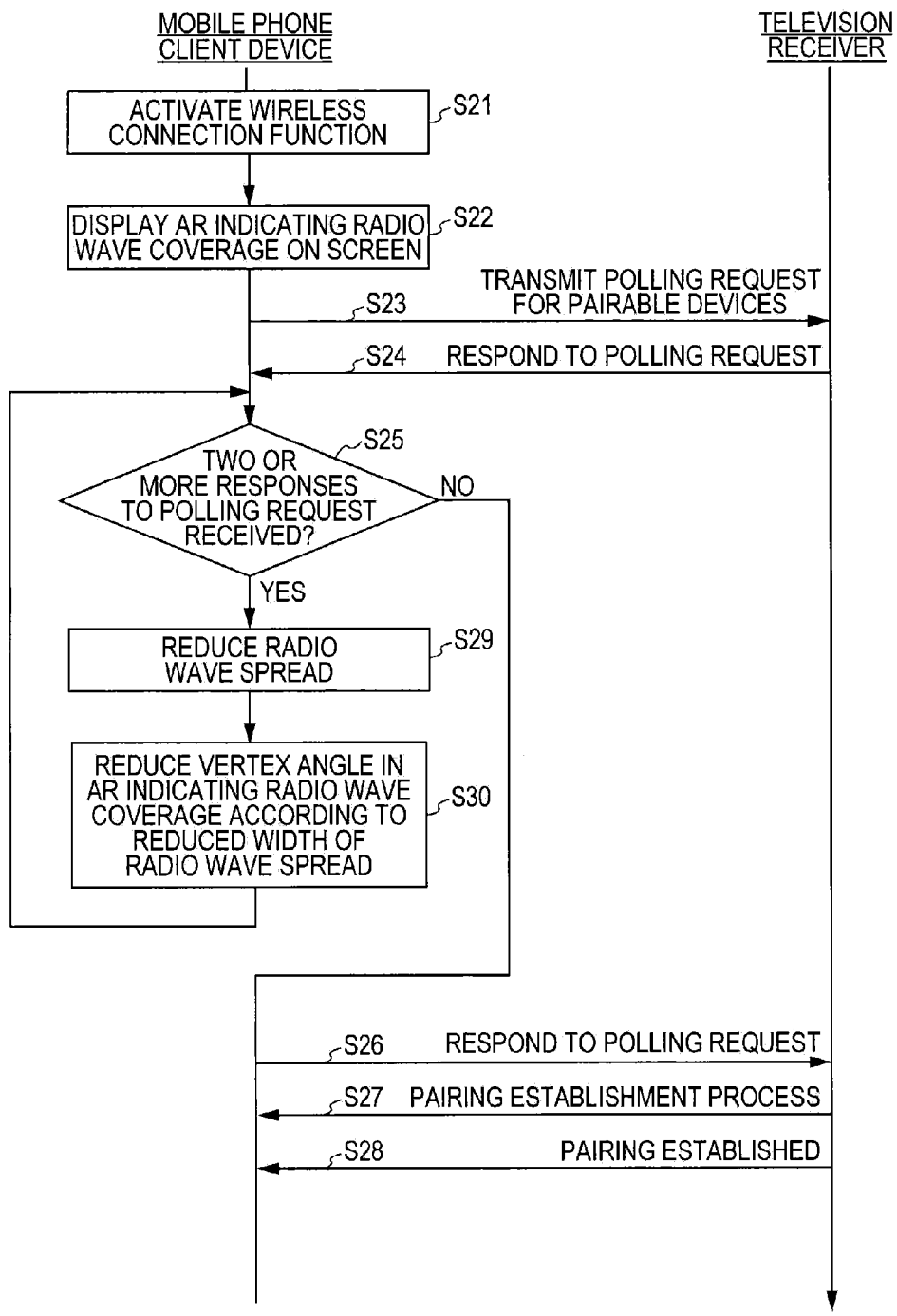
FIG. 12 is a flowchart illustrating processing by a mobile phone client device according to a second embodiment of the present disclosure.

For this reason, "YES" is selected in step S25 of FIG. 12, and the process proceeds to step S29.

In step S29, control is applied by the radio wave output range controller 115 (see FIG. 11) to narrow the output range, or in other words the spread angle Da, of the radio wave Wv. Additionally, processing is conducted by the AR display processor 114 (see FIG. 11) to narrow the angle Ag of the vertex Cn of the virtual object Ar4 representing the coverage of the radio wave Wv in correspondence with the spread angle Da narrowed in step S29 (step S30). By conducting such processing, the spread angle Da of the radio wave Wv actually being emitted from the mobile phone client device 100*a* becomes narrower, while the angle Ag in the virtual object Ar4 also becomes narrower, as illustrated in FIG. 14.

Narrowing the spread angle Da of the radio wave Wv actually being emitted also restricts the range over which the polling request for pairable devices is transmitted in step S23. Accordingly, the number of responses transmitted in step S24 of FIG. 12 and received by the mobile phone client device 100*a* also decreases. The control to narrow the output range of the radio wave Wv in step S29 then continues until the number of received responses becomes 1. In other words, the spread angle Da of the radio wave Wv is automatically adjusted to an angle such that the number of received responses becomes 1.

Once the number of received responses to the polling request has become 1 or less, "No" is selected in step S25 and the process proceeds to step S26. In other words, a pairing request is issued to the device from which the response to the polling request originated (step S26) and a pairing establishment process is conducted (step S27), thereby establishing a pairing (step S28).

According to the second embodiment discussed above, the spread angle Da of a radio wave Wv emitted from a mobile phone client device 100*a* when issuing a polling request for pairable devices is automatically adjusted to an angle such that the number of responses becomes 1. In other words, the spread angle Da of the radio wave Wv progressively becomes narrower. Also, the user is able to visually recognize the direction and angle in which the actual radio wave Wv is being emitted with a virtual object Ar4 that artificially represents the coverage of the actual radio wave Wv. Thus, it becomes possible to reliably match the direction in which the actual radio wave Wv is being emitted with the direction of a desired device to pair with by merely performing a simple operation of adjusting the direction and angle in which the mobile phone client device 100*a* is held up. Additionally, it becomes possible to easily conduct pairing with a desired device, without entering into a procedure of selecting a desired device to pair with from a list, etc.

Figure 16:
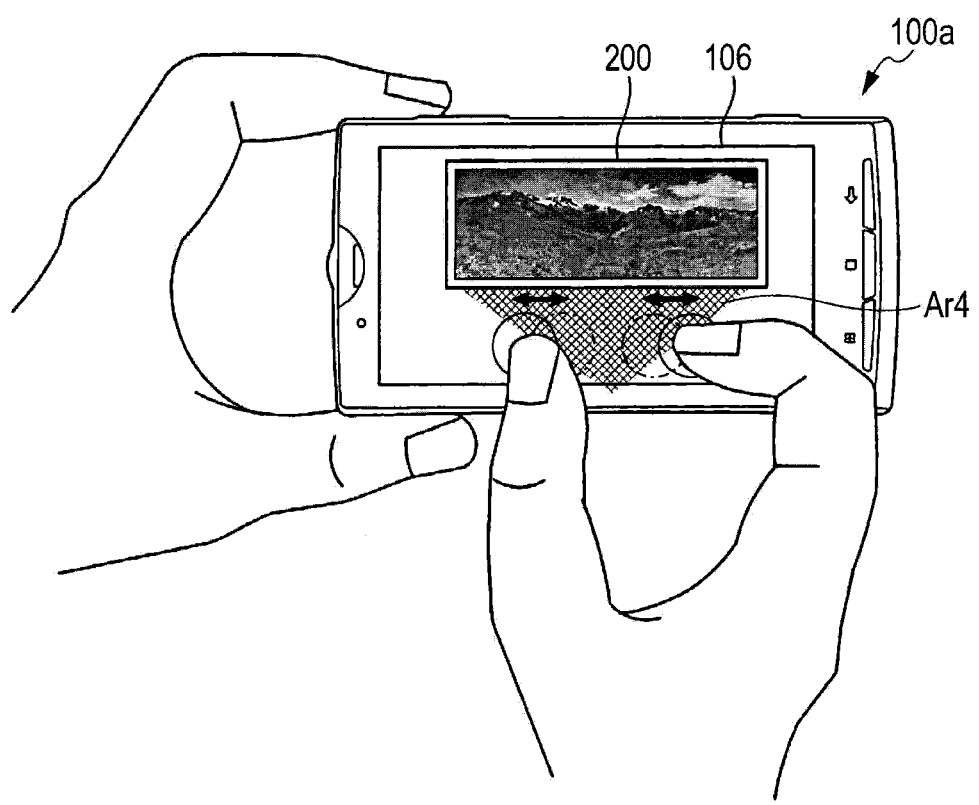
FIG. 16 is an explanatory diagram illustrating an exemplary display of a virtual object according to a modification of a second embodiment of the present disclosure.

Note that although an example wherein the radio wave output range controller 115 automatically adjusts the spread angle Da of the radio wave Wv is given in the second embodiment discussed above, an embodiment is not limited thereto. For example, it may also be configured such that the user is able to adjust the controlled width of the spread angle Da of the radio wave Wv. An exemplary screen display on a mobile phone client device 100*a* in the case of configuring in this way is illustrated in FIG. 16. In FIG. 16, like reference symbols are given to portions corresponding to FIG. 11, and duplicate description thereof will be reduced or omitted.

The virtual object Ar4 displayed on-screen on the display unit 106 in FIG. 16 is configured such that its angle Ag is adjustable by a pinch operation in which two of the user's fingers are moved while in a state of touching the screen. In other words, the angle Ag of the virtual object Ar4 is varied according to how far the user's fingers move in the pinch operation, and in addition, the spread angle Da of the radio wave Wv actually being emitted from the mobile phone client device 100*a* is also varied.

Figure 17:
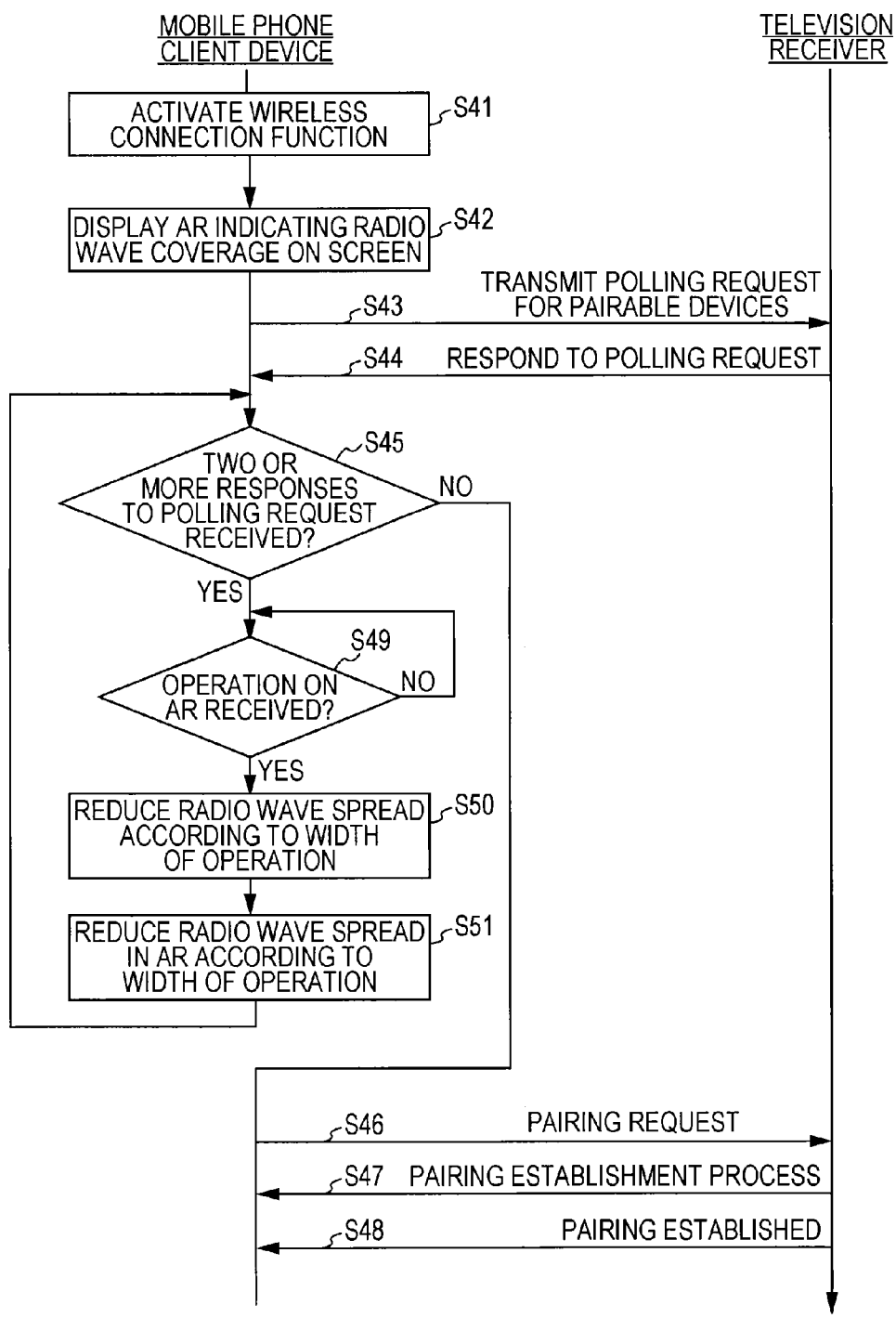
FIG. 17 is a flowchart illustrating exemplary processing by a mobile phone client device according to a modification of a second embodiment of the present disclosure.

FIG. 17 illustrates a flowchart of exemplary processing by a mobile phone client device 100*a* according to the modification illustrated in FIG. 16. First, when a wireless connection function (not illustrated) is activated on the basis of an operation on the operable unit 107, etc. (step S41), a virtual object Ar4 representing the radio wave coverage is displayed on-screen, on the basis of control by the AR display processor 114 (see FIG. 11) (step S42).

Subsequently, when a polling request for pairable devices is broadcast under control by the wireless communication processor 111 (step S43), a response to the polling request is transmitted from any devices that have received the polling request (step S44). Then, it is determined if two or more responses to the polling request have been received (step S45). In the case where only one response to the polling request has been received, the SSID and other information included in the response received in step S44 is used to transmit a pairing request to the device from which the response originated (step S46). Then, a process is conducted to establish a pairing with the device that received the pairing request (step S47), and a pairing is established (step S48).

Figure 18:
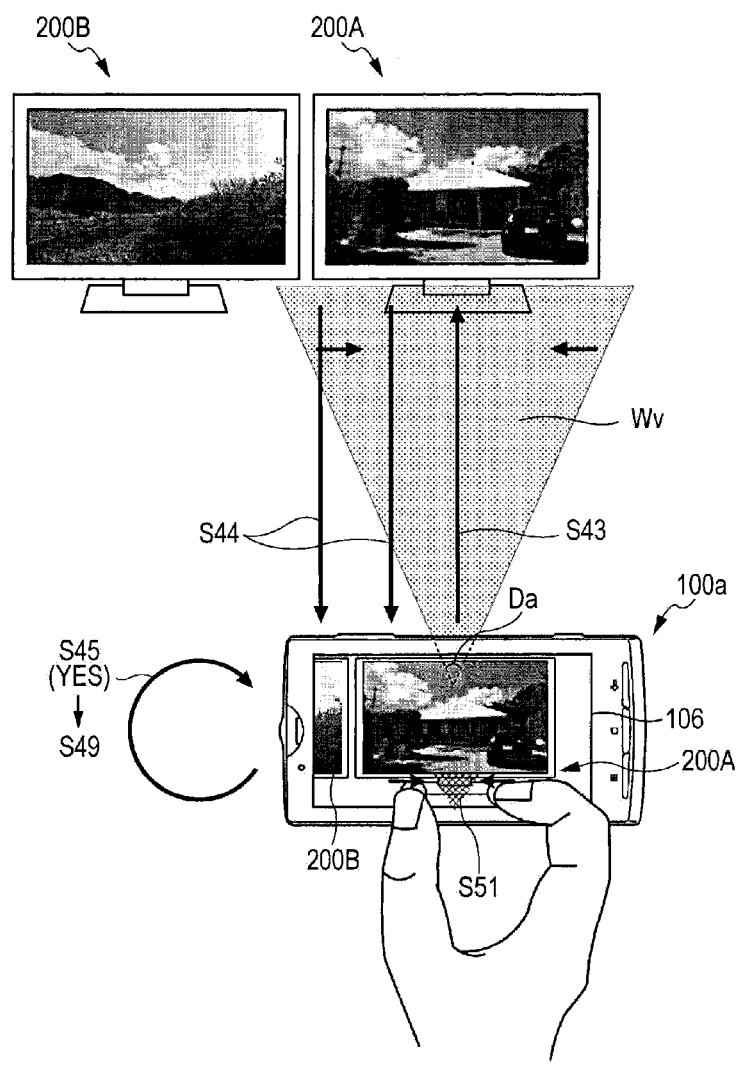
FIG. 18 is an explanatory diagram illustrating exemplary processing in the case where there are two nearby devices available for pairing, according to a modification of a second embodiment of the present disclosure.

In the case where plural pairable devices exist near the mobile phone client device 100*a*, as illustrated in FIG. 18, the number of responses received in step S44 also becomes plural. For this reason, "YES" is selected in step S45 of FIG. 12, and the process proceeds to step S49.

In step S49, it is determined if an operation (pinch operation) on the virtual object Ar4 by the user has been received, and if not received, the determination in step S49 continues. In the case where a pinch operation by the user has been received, control is applied by the radio wave output range controller 115 (see FIG. 11) to narrow the output range, or in other words the spread angle Da, of the radio wave Wv according to the width of the pinch operation (step S50). Additionally, processing is also conducted by the AR display processor 114 (see FIG. 11) to narrow the angle Ag of the vertex Cn of the virtual object Ar4 representing the coverage of the radio wave Wv (see FIG. 10) in correspondence with the width of finger movement in the pinch operation conducted in step S49 (step S51).

Figure 19:
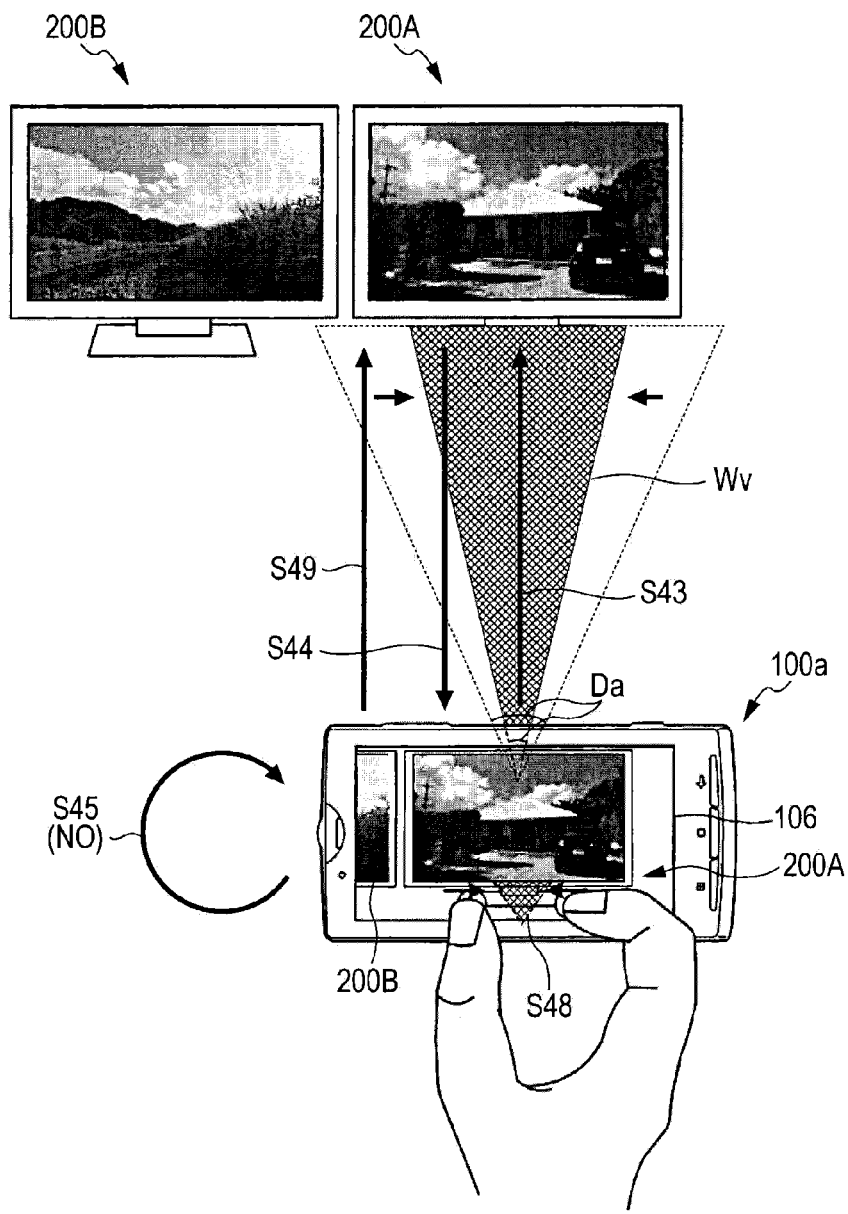
FIG. 19 is an explanatory diagram illustrating exemplary processing in the case where there are two nearby devices available for pairing, according to a modification of a second embodiment of the present disclosure.

By conducting such processing, the spread angle Da of the radio wave Wv actually being emitted from the mobile phone client device 100*a* becomes a narrow width corresponding to the width of movement in a pinch operation conducted on the virtual object Ar4, as illustrated in FIG. 19. Then, once the number of received responses to the polling request has become 1 or less, "No" is selected in step S45 and the process proceeds to step S46. In other words, a pairing request is issued to the device from which the response to the polling request originated (step S46) and a pairing establishment process is conducted (step S47), thereby establishing a pairing (step S48).

Even in the case of configuring and conducting processing in this way, advantages are obtained which are similar those obtained by the second embodiment described with reference to FIGS. 10 to 15. Furthermore, by conducting the process illustrated in FIG. 17, it becomes possible to further shorten the time until the desired pairing target device narrowed down to one device.

Herein, the series of processes in the embodiments discussed above may be executed in hardware, but may also be executed in software. In the case of executing the series of processes in software, a program constituting such software is executable by a computer built into special-purpose hardware, or a computer on which programs for executing various functions are installed.

Also, a recording medium recording the program code of software that realizes the functions of an embodiment discussed above may be supplied to a system or apparatus. Obviously, functions may also be realized by a computer (or CPU or other control apparatus) in such a system or apparatus reading out and executing program code stored in a recording medium.

A flexible disk, hard disk, optical disc, magneto-optical disc, CD-ROM, CD-R, magnetic tape, non-volatile memory card, or ROM, for example, may be used as the recording medium for supplying program code in such cases.

Also, the functions of an embodiment discussed above may be realized by executing program code read out by a computer. Moreover, all or part of the actual processing may be conducted by an OS operating on the computer, on the basis of instructions from such program code, including cases where the functions of an embodiment discussed above are realized by such processing.

Also, in this specification, processing steps that state a process in a time series may obviously include processes conducted in a time series following the described order, but may also include processes executed in parallel or individually (for example, parallel processing or object-oriented processing) without necessarily being processed in a time series.

Also, the configurations and processes described in the claims of the present disclosure are not limited to the exemplary embodiments discussed above. It is to be understood as obvious by persons skilled in the art that various alterations, combinations, and other embodiments may occur depending on design or other factors insofar as they are within the scope of the claims or their equivalents.

Herein, the present disclosure may also take configurations like the following.

(1) An information processing apparatus comprising:
a storage unit that stores a table associating first identification information corresponding to the information processing apparatus, second identification information corresponding to another information processing apparatus, and an image corresponding to the another information processing apparatus;
a wireless interface configured to communicate with the another information processing apparatus;
an imaging unit that captures image data;
an image recognition unit that determines whether the captured image data includes the image corresponding to the another information processing apparatus; and
a controller that controls the wireless interface to transmit, to the another information processing apparatus, a request for pairing with the another information processing apparatus when the image recognition unit determines that the captured image data includes the image corresponding to the another information processing apparatus.

(2) The information processing apparatus of (1), wherein the second identification information corresponding to the another information processing apparatus includes address information corresponding to the another information processing apparatus.

(3) The information processing apparatus of (2), wherein the address information corresponding to the another information processing apparatus includes at least one of a Media Access Control (MAC) address and a Service Set IDentifier (SSID).

(4) The information processing apparatus of (2) or (3), wherein
the controller controls the wireless interface to transmit the request for pairing to the another information processing apparatus based on the address information.

(5) The information processing apparatus of any of (1) to (3), further comprising:
a communication interface configured to communicate with a server that manages the association between the first identification information, the second identification information and the image.

(6) The information processing apparatus of (5), wherein the controller controls the communication interface to transmit, to the server, a request including the first identification information corresponding to the information processing apparatus, and
the communication interface receives, from the server, the second identification information and the image in response to the request.

(7) The information processing apparatus of claim 6), further comprising:
a user interface that receives a user input requesting the information processing apparatus to poll the server for at least one another information processing apparatus available for pairing.

(8) The information processing apparatus of (7), wherein the controller controls the communication interface to transmit the request to the server in response to the user input received at the user interface.

(9) The information processing apparatus of any of (5) to (8), wherein
the controller controls the storage unit to store the association between the first identification information, the second identification information and the image upon receiving the second information and the image from the server.

(10) The information processing apparatus of any of (1) to (9), wherein
the storage unit stores an association between first identification information corresponding to the information processing apparatus, and a plurality of second identification information corresponding to a plurality of another information processing apparatuses, and a plurality of images corresponding each of the plurality of another information processing apparatuses.

(11) The information processing apparatus of any of (1) to (10), further comprising:
a display that displays the captured image data.

(12) The information processing apparatus of (11), wherein
the wireless interface receives, from the another information processing apparatus, confirmation that paring with the another information processing apparatus has been established.

(13) The information processing apparatus of (12), wherein
the controller controls the display to display a virtual object on the captured image data indicating that pairing with the another information processing apparatus has been established based on the confirmation received from the another information processing apparatus.

(14) The information processing apparatus of any of (1) to (13), wherein
the storage unit stores the table associating the first identification information corresponding to the information processing apparatus, the second identification information corresponding to the another information processing apparatus, the image corresponding to the another information processing apparatus, and information corresponding to at least one communication protocol supported by the another information processing apparatus.

(15) The information processing apparatus of (14), further comprising:
a user interface including a display that displays the captured image data.

(16) The information processing apparatus of (15), wherein
the controller controls the display to display a virtual object on the captured image data indicating the at least one protocol supported by the another information processing apparatus.

(17) The information processing apparatus of (16), wherein
the user interface receives a selection corresponding to the at least one protocol supported by the another information processing apparatus.

(18) The information processing apparatus of (17), wherein
the controller that controls the wireless interface to transmit, to the another information processing apparatus, the request for pairing with the another information processing apparatus that includes information identifying the at least one protocol corresponding to the selection received at the user interface.

(19) An information processing method performed by an information processing apparatus, the method comprising:
storing a table associating first identification information corresponding to the information processing apparatus, second identification information corresponding to another information processing apparatus, and an image corresponding to the another information processing apparatus;
capturing image data by an imaging unit;
determining whether the captured image data includes the image corresponding to the another information processing apparatus; and
controlling a wireless interface to transmit, to the another information processing apparatus, a request for pairing with the another information processing apparatus when the determining determines that the captured image data includes the image corresponding to the another information processing apparatus.

(20) A non-transitory computer-readable medium including computer program instructions, which when executed by an information processing apparatus, cause the information processing apparatus to perform a process comprising:
storing a table associating first identification information corresponding to the information processing apparatus, second identification information corresponding to another information processing apparatus, and an image corresponding to the another information processing apparatus;
capturing image data;
determining whether the captured image data includes the image corresponding to the another information processing apparatus; and
controlling a wireless interface to transmit, to the another information processing apparatus, a request for pairing with the another information processing apparatus when the determining determines that the captured image data includes the image corresponding to the another information processing apparatus.

The invention claimed is:

1. An information processing apparatus comprising:
a memory configured to store a device management list associating first identification information corresponding to the information processing apparatus, second identification information corresponding to another information processing apparatus, and a dictionary image corresponding to the another information processing apparatus, the second identification information comprising address information corresponding to the another information processing apparatus and an indication of a connection method for connecting with the another information processing apparatus, the dictionary image being an image assigned one-to-one to each of a plurality of information processing apparatuses including the information processing apparatus and the another information processing apparatus;
a wireless interface configured to communicate with the another information processing apparatus;
an imaging unit that captures image data displayed by a display of the another information processing apparatus; and
circuitry configured to
send a request for the device management list to a server that is separate from the information processing apparatus and the other information processing apparatus;
receive the device management list from the server and control the memory to store the device management list;
determine whether the captured image data displayed by the another information processing apparatus includes the dictionary image corresponding to the another information processing apparatus and stored in the device management list; and
when it is determined that the captured image data displayed by the another information processing apparatus includes the dictionary image corresponding to the another information processing apparatus:
retrieve, from the memory, the second identification information; and
control the wireless interface to transmit, to the another information processing apparatus, a request for pairing with the another information processing apparatus, the request for pairing being based on the second identification information.

2. The information processing apparatus of claim 1, wherein
the address information corresponding to the another information processing apparatus includes at least one of a Media Access Control (MAC) address and a Service Set Identifier (SSID).

3. The information processing apparatus of claim 1, further comprising:
a communication interface configured to communicate with the server.

4. The information processing apparatus of claim 3, wherein
the circuitry is configured to control the communication interface to transmit, to the server, the request including the first identification information corresponding to the information processing apparatus, and
the communication interface receives, from the server, the device management list including the second identification information and the dictionary image in response to the request.

5. The information processing apparatus of claim 4, further comprising:
a user interface that receives a user input requesting the information processing apparatus to poll the server for at least one another information processing apparatus available for pairing.

6. The information processing apparatus of claim 5, wherein
the circuitry is configured to control the communication interface to transmit the request to the server in response to the user input received at the user interface.

7. The information processing apparatus of claim 4, wherein
the circuitry is configured to control the memory to store the association between the first identification information, the second identification information and the dictionary image upon receiving the second information and the dictionary image from the server.

8. The information processing apparatus of claim 1, wherein
the memory is configured to store an association between first identification information corresponding to the information processing apparatus, and a plurality of second identification information corresponding to a plurality of another information processing apparatuses, and a plurality of the dictionary images corresponding each of the plurality of another information processing apparatuses, the plurality of the dictionary images being assigned one-to-one to the plurality of another information processing apparatuses.

9. The information processing apparatus of claim 1, further comprising:
a display that displays the captured image data.

10. The information processing apparatus of claim 9, wherein
the wireless interface receives, from the another information processing apparatus, confirmation that paring with the another information processing apparatus has been established.

11. The information processing apparatus of claim 10, wherein
the circuitry is configured to control the display to display a virtual object on the captured image data indicating that pairing with the another information processing apparatus has been established based on the confirmation received from the another information processing apparatus.

12. The information processing apparatus of claim 1, wherein
the indication of the connection method comprises information corresponding to at least one communication protocol supported by the another information processing apparatus.

13. The information processing apparatus of claim 12, further comprising:
a user interface including a display that displays the captured image data.

14. The information processing apparatus of claim 13, wherein
the circuitry is configured to control the display to display a virtual object on the captured image data indicating the at least one protocol supported by the another information processing apparatus.

15. The information processing apparatus of claim 14, wherein
the user interface receives a selection corresponding to the at least one protocol supported by the another information processing apparatus.

16. The information processing apparatus of claim 15, wherein
the circuitry is configured to control the wireless interface to transmit, to the another information processing apparatus, the request for pairing with the another information processing apparatus that includes information identifying the at least one protocol corresponding to the selection received at the user interface.

17. An information processing method performed by an information processing apparatus, the method comprising:
sending, to a server that is separate from the information processing apparatus and another information processing apparatus, a request for a device management list associating first identification information corresponding to the information processing apparatus, second identification information corresponding to the another information processing apparatus, and a dictionary image corresponding to the another information processing apparatus, the second identification information comprising address information corresponding to the another information processing apparatus and an indication of a connection method for connecting with the another information processing apparatus, the dictionary image being an image assigned one-to-one to each of a plurality of information processing apparatuses including the information processing apparatus and the another information processing apparatus:
receiving the device management list from the server and storing the device management list in a memory;
capturing image data displayed by a display of the another information processing apparatus by an imaging unit;
determining whether the captured image data displayed by the another information processing apparatus includes the dictionary image corresponding to the another information processing apparatus and stored in the device management list; and
when the determining determines that the captured image data displayed by the another information processing apparatus includes the dictionary image corresponding to the another information processing apparatus:
retrieving, from the memory, the second identification information; and
controlling a wireless interface to transmit, to the another information processing apparatus, a request for pairing with the another information processing apparatus, the request for pairing being based on the second identification information.

18. A non-transitory computer-readable medium including computer program instructions, which when executed by an information processing apparatus, cause the information processing apparatus to perform a process comprising:
sending, to a server that is separate from the information processing apparatus and another information processing apparatus, a request for a device management list associating first identification information corresponding to the information processing apparatus, second identification information corresponding to the another information processing apparatus, and a dictionary image corresponding to the another information processing apparatus, the second identification information comprising address information corresponding to the another information processing apparatus and an indication of a connection method for connecting with the another information processing apparatus, the dictionary image being an image assigned one-to-one to each of a plurality of information processing apparatuses including the information processing apparatus and the another information processing apparatus;
receiving the device management list from the server and storing the device management list in a memory;
capturing image data displayed by a display of the another information processing apparatus;

determining whether the captured image data displayed by the another information processing apparatus includes the dictionary image corresponding to the another information processing apparatus; and when the determining determines that the captured image data displayed by the another information processing apparatus includes the dictionary image corresponding to the another information processing apparatus and stored in the device management list:

retrieving, from the memory, the second identification information; and controlling a wireless interface to transmit, to the another information processing apparatus, a request for pairing with the another information processing apparatus, the request for pairing being based on the second identification information.

* * * * *